US009321533B2

(12) United States Patent
Cuddy et al.

(10) Patent No.: US 9,321,533 B2
(45) Date of Patent: Apr. 26, 2016

(54) AIRCRAFT PASSAGEWAY STORAGE UNITS

(71) Applicant: The Boeing Company, Chicago, IL (US)

(72) Inventors: Nathanial C. Cuddy, Snohomish, WA (US); Chris Gren McInelly, Stanwood, WA (US); Roland Mair, Lynnwood, WA (US); Russell W. Keck, Seattle, WA (US); Michael S. Lewis, Lake Forest Park, WA (US); Daniel Rivera, Mill Creek, WA (US); Tushar Mayur Sampat, Lynnwood, WA (US); Derrick Joseph Hanratty, Lake Stevens, WA (US); Harold Glenn Erickson, Mukilteo, WA (US); Mitchell Kotlik, Everett, WA (US); Timothy Mark Jones, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 77 days.

(21) Appl. No.: 14/262,019

(22) Filed: Apr. 25, 2014

(65) Prior Publication Data

US 2014/0355282 A1     Dec. 4, 2014

Related U.S. Application Data

(60) Provisional application No. 61/828,646, filed on May 29, 2013.

(51) Int. Cl.
| | |
|---|---|
| *B64D 11/00* | (2006.01) |
| *B64D 11/04* | (2006.01) |
| *B64C 1/14* | (2006.01) |
| *B64C 1/20* | (2006.01) |
| *B64D 47/02* | (2006.01) |

(52) U.S. Cl.
CPC .............. *B64D 11/00* (2013.01); *B64C 1/1407* (2013.01); *B64C 1/20* (2013.01); *B64D 11/04* (2013.01); *B64D 47/02* (2013.01)

(58) Field of Classification Search
None
See application file for complete search history.

(56) References Cited

U.S. PATENT DOCUMENTS

| | | | | |
|---|---|---|---|---|
| 2,763,900 | A | * | 9/1956 | McAfee et al. ..................... 49/70 |
| 4,375,876 | A | * | 3/1983 | Stewart ....................... 244/129.5 |
| D294,896 | S | | 3/1988 | Weiss |

(Continued)

OTHER PUBLICATIONS

Canadian Intellectual Property Office, "Examination Report", issued in connection with Canadian Application No. 2,852,213, on Jun. 12, 2015, 3 pages.

(Continued)

*Primary Examiner* — Medhat Badawi
(74) *Attorney, Agent, or Firm* — Hanley, Flight & Zimmerman, LLC

(57) ABSTRACT

Aircraft passageway storage units are disclosed herein. An example apparatus includes a storage assembly to be supported on a floor of an interior of a fuselage of an aircraft. The storage assembly has a corner to be adjacent a passageway of the interior of the fuselage, and the passageway is to extend around the corner. The example apparatus also includes a door coupled to the storage assembly. The door extends from a first side of the storage assembly to a second side of the storage assembly and defines a portion of the corner. The door is to cover an opening of a compartment of the storage assembly when the door is in a closed position, and the opening is to extend from the first side to the second side.

20 Claims, 19 Drawing Sheets

(56) References Cited

U.S. PATENT DOCUMENTS

| | | | |
|---|---|---|---|
| 5,090,639 A * | 2/1992 | Miller et al. | 244/118.1 |
| 5,224,297 A * | 7/1993 | Watkins | 49/449 |
| 5,907,127 A * | 5/1999 | Daoud | 174/57 |
| 6,007,025 A * | 12/1999 | Coughren et al. | 244/118.6 |
| 6,257,523 B1 * | 7/2001 | Olliges | 244/118.5 |
| 6,318,672 B1 * | 11/2001 | Traylor | 244/118.5 |
| D455,391 S * | 4/2002 | Granzeier et al. | D12/345 |
| 6,470,512 B1 * | 10/2002 | Lau et al. | 4/612 |
| 6,691,952 B2 * | 2/2004 | Keogh | 244/118.5 |
| D604,254 S | 11/2009 | Lanfear et al. | |
| D610,554 S | 2/2010 | Lanfear et al. | |
| D611,005 S | 3/2010 | Lanfear et al. | |
| D611,006 S | 3/2010 | Lanfear et al. | |
| D615,045 S | 5/2010 | Lanfear et al. | |
| D631,446 S | 1/2011 | Lanfear et al. | |
| 8,047,467 B2 | 11/2011 | Erickson et al. | |
| 8,820,862 B1 * | 9/2014 | Erickson et al. | 312/257.1 |
| D730,804 S | 6/2015 | Cuddy et al. | |
| 2005/0116098 A1 * | 6/2005 | Martens et al. | 244/118.5 |
| 2007/0102579 A1 * | 5/2007 | Krieglsteiner et al. | 244/129.1 |
| 2007/0170310 A1 * | 7/2007 | Bock et al. | 244/118.5 |
| 2009/0146005 A1 * | 6/2009 | Bettell | 244/118.6 |
| 2009/0206200 A1 * | 8/2009 | Bolder et al. | 244/118.5 |
| 2009/0294586 A1 | 12/2009 | Brown et al. | |
| 2010/0001126 A1 * | 1/2010 | Supan et al. | 244/1 A |
| 2010/0116933 A1 * | 5/2010 | Erickson et al. | 244/118.5 |
| 2010/0219292 A1 * | 9/2010 | Saint-Jalmes et al. | 244/118.5 |
| 2011/0101160 A1 * | 5/2011 | Gomes et al. | 244/118.5 |
| 2011/0210204 A1 * | 9/2011 | Collins et al. | 244/118.6 |
| 2012/0047911 A1 * | 3/2012 | Bhavsar et al. | 62/3.6 |
| 2012/0217343 A1 * | 8/2012 | Koschberg et al. | 244/118.5 |
| 2012/0248245 A1 * | 10/2012 | Schliwa | 244/118.5 |
| 2012/0261509 A1 * | 10/2012 | Grant et al. | 244/118.5 |
| 2012/0298798 A1 * | 11/2012 | Henshaw et al. | 244/118.6 |
| 2012/0318918 A1 * | 12/2012 | Johnson et al. | 244/118.6 |
| 2013/0187000 A1 * | 7/2013 | Godecker et al. | 244/118.5 |
| 2013/0206906 A1 * | 8/2013 | Burrows et al. | 244/118.5 |
| 2013/0247590 A1 * | 9/2013 | Lu et al. | 62/3.6 |
| 2013/0248655 A1 * | 9/2013 | Kroll et al. | 244/118.6 |
| 2013/0257067 A1 * | 10/2013 | Burd | 292/200 |
| 2013/0259562 A1 * | 10/2013 | Burd | 403/187 |
| 2014/0054416 A1 * | 2/2014 | Lee | 244/118.1 |
| 2014/0238064 A1 * | 8/2014 | Hawkins et al. | 62/244 |
| 2014/0263835 A1 * | 9/2014 | Godecker et al. | 244/118.5 |
| 2014/0339363 A1 * | 11/2014 | Moje et al. | 244/118.5 |
| 2014/0355282 A1 * | 12/2014 | Cuddy et al. | 362/471 |
| 2014/0359934 A1 * | 12/2014 | Schliwa et al. | 4/664 |

OTHER PUBLICATIONS

United States Patent and Trademark Office, "Notice of Allowance", issued in connection with U.S. Appl. No. 29/456,269, on Jan. 23, 2015, 18 pages.

* cited by examiner

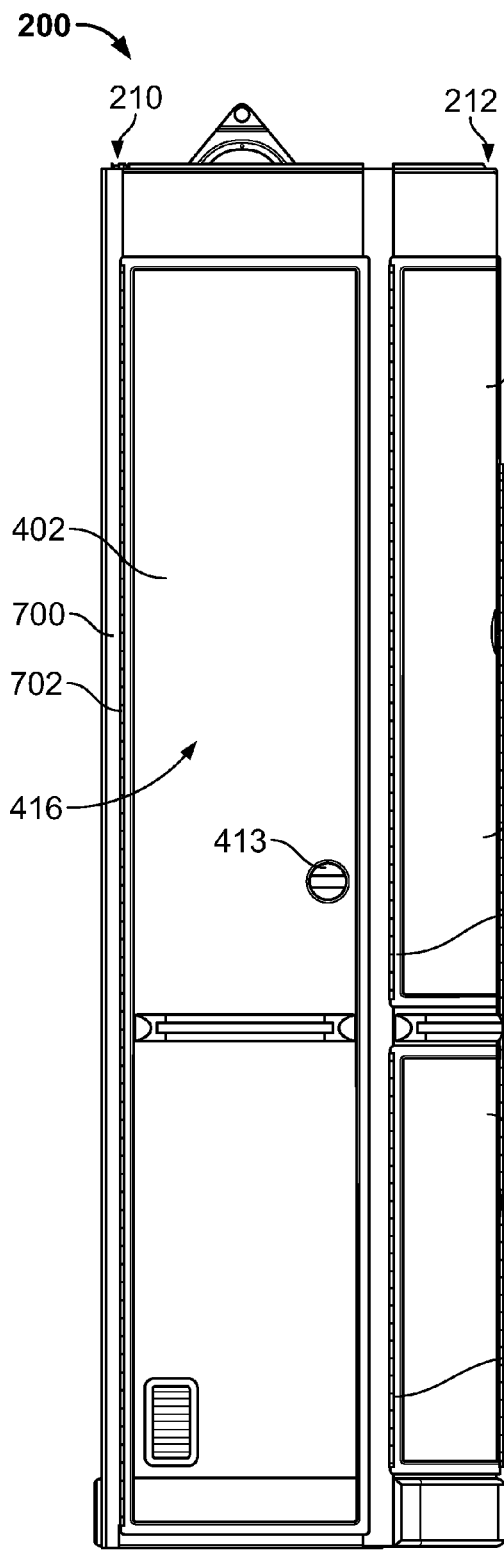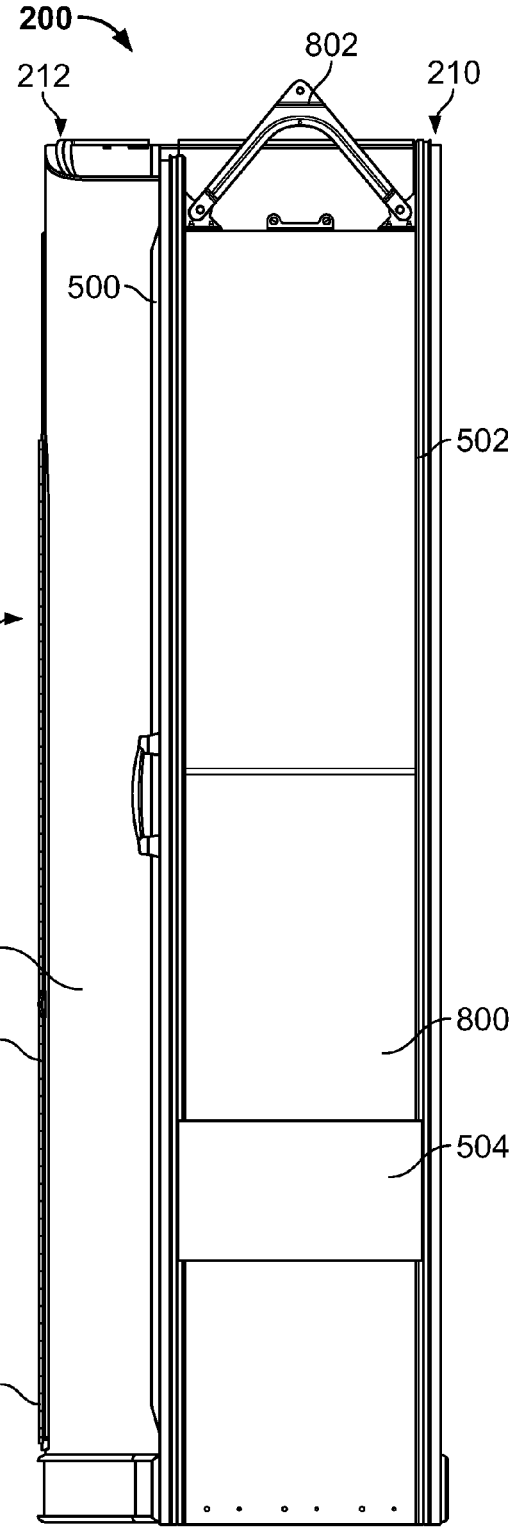
FIG. 7
FIG. 8

AIRCRAFT PASSAGEWAY STORAGE UNITS

RELATED APPLICATION

This patent claims priority to U.S. Provisional Application Ser. No. 61/828,646, which was filed on May 29, 2013 and is hereby incorporated herein by reference in its entirety.

FIELD

The present disclosure relates generally to aircraft interior monuments and, more particularly, to aircraft passageway storage units.

BACKGROUND

Generally, an aircraft includes a passageway storage unit adjacent a cabin door that passengers and/or crew move past when entering and/or exiting a passenger seating area of the aircraft via the cabin door. The passageway storage unit typically includes an angled corner adjacent a cabin aisle, which is difficult for passengers and/or crew to maneuver around when entering and exiting the passenger seating area.

SUMMARY

An example apparatus disclosed herein includes a first storage assembly including a storage compartment. The first storage assembly is to be supported on an interior floor of a fuselage of an aircraft. The first storage assembly includes a first side, a curved first corner, and a second side to define a portion of a passageway in the fuselage. The example apparatus also includes a compartment door coupled to the first storage assembly. The compartment door includes a curved section defining a portion of the curved first corner. The storage compartment has an opening extending from the first side to the second side of the first storage assembly when the compartment door is in a fully open position.

Another example apparatus disclosed herein includes an aircraft including a fuselage. The example apparatus also includes a passageway storage unit supported on an interior floor of the fuselage. The example passageway storage unit includes a first side to be adjacent a first portion of a passageway of the fuselage of an aircraft. The first portion of the passageway is to extend in a first direction. The example passageway storage unit also includes a second side to be adjacent a second portion of the passageway of the fuselage. The second portion of the passageway is to extend in a second direction different than the first direction. The example passageway storage unit further includes a curved corner extending from the first side to the second side. Passengers of the aircraft are to move around the curved corner to move between the first portion of the passageway and the second portion of the passageway. The example passageway storage unit also includes a compartment accessible via an opening defined by the first side, the second side and the curved corner. A door is coupled to the passageway storage unit. The door defines a portion of the curved corner, and the door in a closed position is to cover the opening of the compartment. The door in a fully open position is to enable access to the compartment via the opening.

Another example apparatus disclosed herein includes a storage assembly to be supported on a floor of an interior of a fuselage of an aircraft. The example storage assembly has a corner to be adjacent a passageway of the interior of the fuselage, and the passageway is to extend around the corner. The example apparatus also includes a door coupled to the storage assembly. The door extends from a first side of the storage assembly to a second side of the storage assembly and defines a portion of the corner. The door is to cover an opening of a compartment of the storage assembly when the door is in a closed position, and the opening is to extend from the first side to the second side.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 7 is a first side view of the example passageway storage unit of FIGS. 2-6.

FIG. 8 is a second side view of the example passageway storage unit of FIGS. 2-7.

Figure 1:
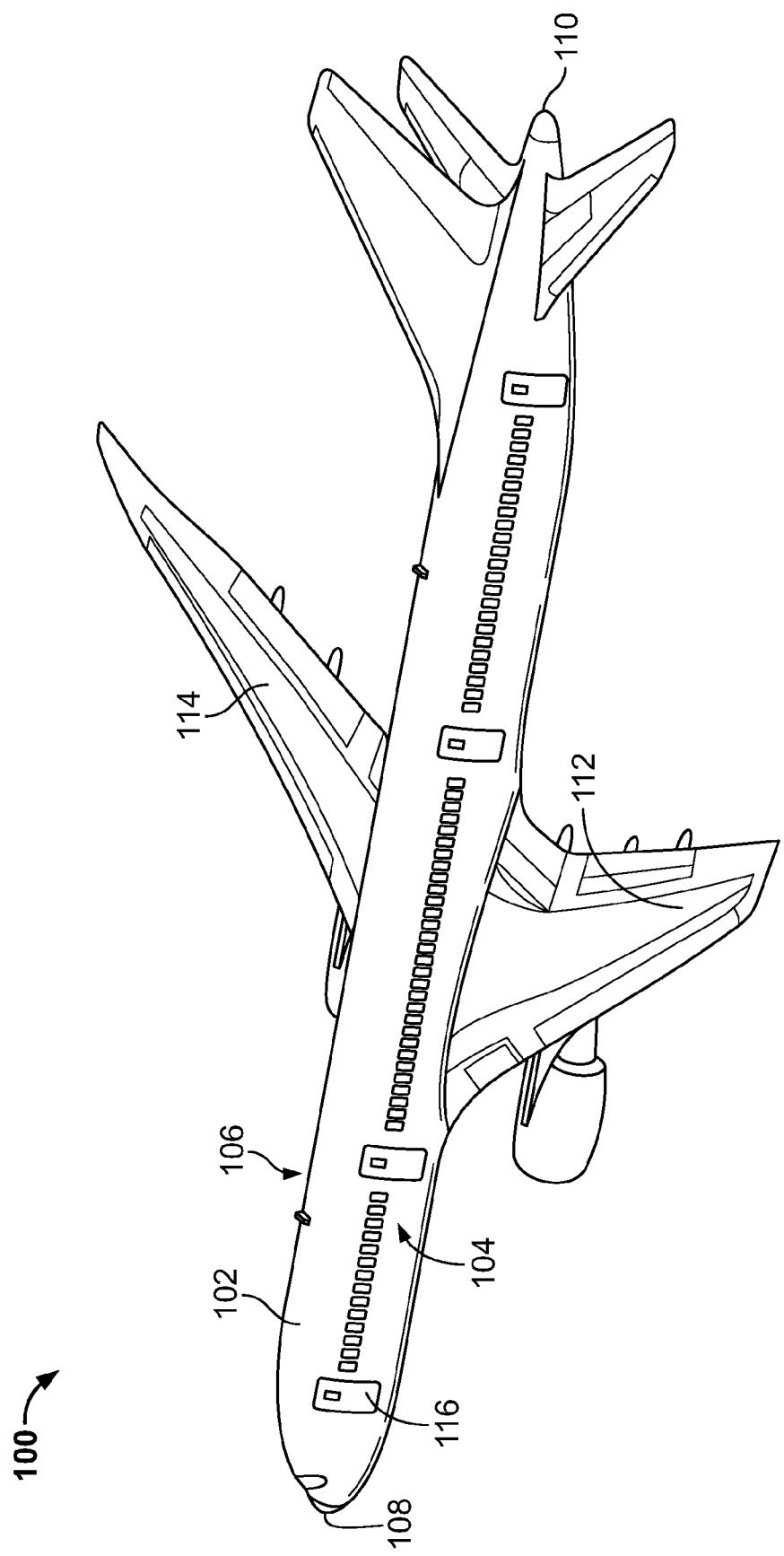
FIG. 1 illustrates an example aircraft in which example aircraft passageway storage units may be employed.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Aircraft passageway storage units are disclosed herein. An example passageway storage unit includes a first storage assembly coupled to a second storage assembly. In some examples, the first storage assembly and/or the second storage assembly are to be coupled to and/or supported on an interior floor of a fuselage of an aircraft. In some examples, the first storage assembly is coupled to a side of the fuselage of the aircraft, and the second storage assembly is spaced apart from the side of the fuselage. In some examples, an area (e.g., a strip) of the first storage assembly along an edge of the second storage assembly adjacent the side of the fuselage is illuminated. The passageway storage unit may be disposed adjacent a passageway (e.g., an aisle) and/or a passenger seating area of the aircraft. The passageway storage unit may include one or more curved corners to enable passengers and/or crew to easily move around the corner of the passageway storage unit between a first portion of the passageway (e.g., extending from an entranceway of the aircraft in a first direction) and a second portion of the passageway (e.g., extending in a second direction through the passenger seating area). In some examples, the second storage assembly defines at least one the curved corners, and a radius of curvature of the curved corner is similar to or about the same as a depth of the second storage assembly.

In some examples, the passageway storage unit includes a plurality of doors and/or compartments (e.g., closets). In some examples, one or more of the doors define a portion of the one or more sides of the passageway storage unit and/or a portion of one or more of the curved corners. In some examples, the doors cover openings to the compartments in a closed position and enable access to the compartments via the openings when the doors are in an open position. Some example passageway storage units include compartment openings defined by a first side of the passageway storage unit, a second side of the passageway storage unit, and one of the curved corners.

In some examples, the passageway storage unit includes a cavity (e.g., a compartment that is not covered by a door) that includes one or more items (e.g., a plant, a sculpture, a picture, a painting, a sign, an electronic display screen (e.g., a computer monitor, a television screen, etc.) and/or any other item(s)) that may be decorative, functional and/or display information (e.g., arrival destination, flight number, safety information and/or any other information) and/or media (videos, pictures, advertisements, websites, and/or any other media).

FIG. 1 is a perspective view of an example aircraft 100 in which aspects of the present disclosure may be implemented. The example aircraft 100 of FIG. 1 includes a fuselage 102 having a left side 104, a right side 106, a nose end 108 and a tail end 110. A first wing 112 is coupled to the left side 104 of the fuselage 102. A second wing 114 is coupled to the right side 106 of the fuselage 102. In the illustrated example, the aircraft 100 includes a door 116 disposed on the left side 104 of the fuselage 102. Passengers and/or crew may enter (e.g., board) and/or exit (e.g., disembark) the aircraft 100 via the door 116. The aircraft 100 of FIG. 1 is merely an example and, thus, other aircrafts may be used without departing from the scope of this disclosure.

Figure 2:
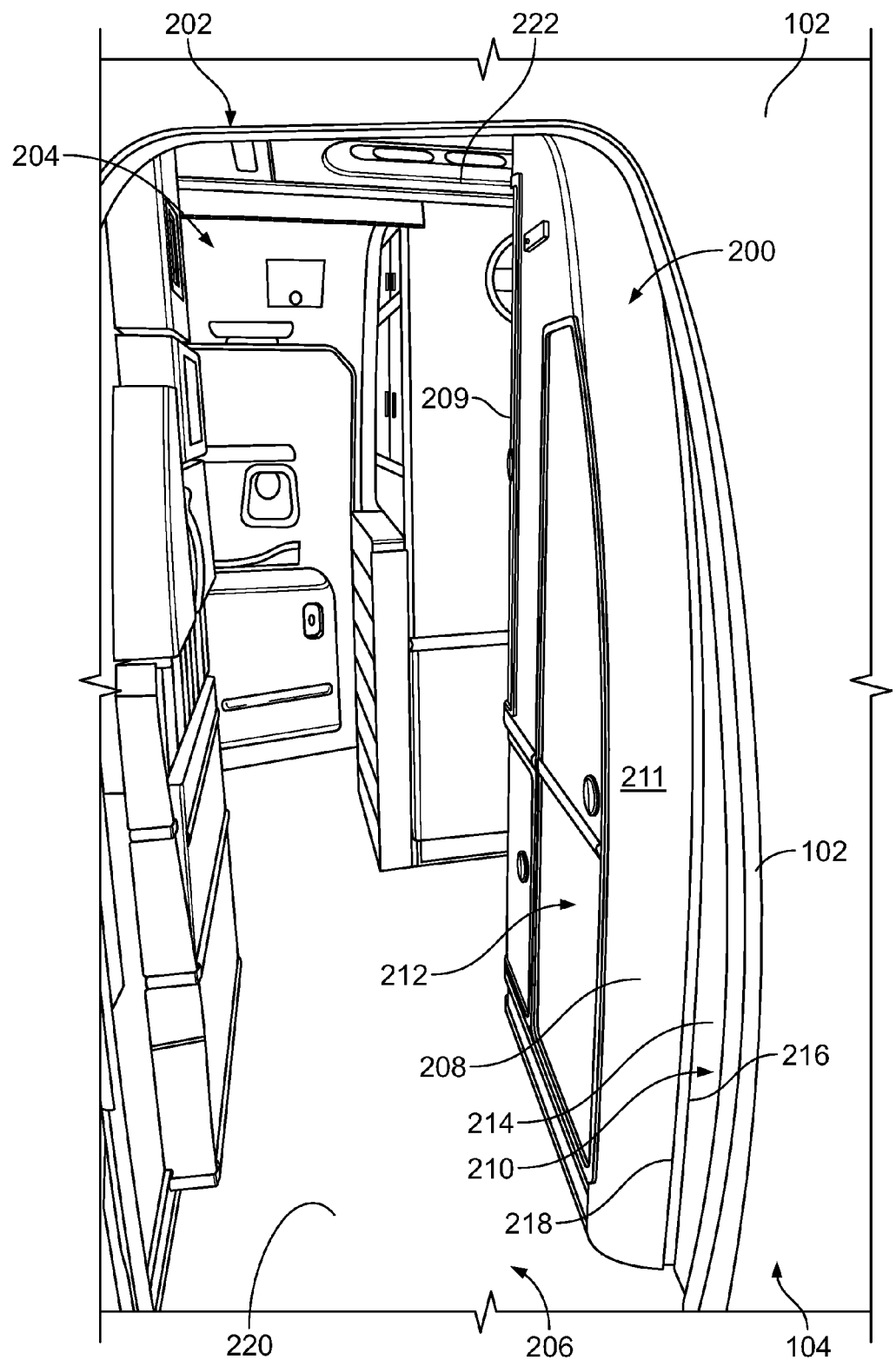
FIG. 2 illustrates an example passageway storage unit disclosed herein disposed inside the example aircraft of FIG. 1.

FIG. 2 illustrates an example passageway storage unit 200 disposed adjacent a passageway or aisle 206 of a cabin or interior 204 of the aircraft 100 of FIG. 1. In the illustrated example, the passageway storage unit 200 is disposed on a right side of the passageway or aisle 206 adjacent an entranceway 202 of the aircraft 100 and/or the door 116 from a perspective of the passengers and/or the crew when the passengers and/or the crew enter the aircraft 100 via the door 116. In the illustrated example, the passageway storage unit 200 extends from the left side 104 of the fuselage 102 toward the right side 106 of the fuselage 102. As described in greater detail below in conjunction with FIG. 4, as the passengers and/or the crew move along an aisle or passageway 206 between the entranceway 202 and a passenger seating area 400 (FIG. 4) in the interior 204, the passengers and/or the crew move passed a first curved corner 208 and around a second curved corner 209 of the passageway storage unit 200.

The example passageway storage unit of FIG. 2 includes a first storage assembly 210 and a second storage assembly 212. The example first storage assembly 210 is coupled to the left side 104 of the fuselage 102. The example second storage assembly 212 includes a first side 211 having the first curved corner 208. The first side 211 of the second storage assembly 212 is coupled to a first front face 214 of the first storage assembly 210. In the illustrated example, the first side 211 extends from the first front face 214 toward the nose end 108 of the aircraft 100. In the illustrated example, the first side 211 of the second storage assembly 212 is spaced apart from the left side 104 of the fuselage 102.

In the illustrated example, a light 900 (FIG. 9) illuminates an area 216 (e.g., a strip) along and/or adjacent an edge 218 of the second storage assembly 212 and the first storage assembly 210. The example edge 218 is disposed adjacent the passageway 206 and extends substantially from a floor 220 of the interior 204 to a ceiling 222 of the interior 204. In some examples, the interior 204 includes illuminated areas (e.g. on the ceiling 222) having patterns and/or shapes complimentary to, accentuated by and/or coordinated with the illuminated area 216 of the passageway storage unit 200. For example, the ceiling 222 may include one or more illuminated areas that align with the illuminated area 216, have a same or different color as the light 900 illuminating the area 216, etc. In some examples, the light illuminating the interior 204 and/or the light 900 illuminating the area 216 is controlled by an interior lighting system to, for example, adjust a color and/or brightness of the light 900, flicker and/or flash the light 900, and/or control a manner in which the area 216 and/or the interior 204 is illuminated in any other way. For example, the interior lighting system may dim or brighten lights in the ceiling 222 and the light 900 illuminating the area 216 at substantially a same time. In some examples, the light 900 illuminating the area 216 indicates a state and/or condition of the aircraft 100. For example, the light 900 may be a first color when the door 116 is open and a second color when the door 116 is closed. The example light 900 may also illuminate the area 216 and/or space near and/or around the area 216 to, for example, illuminate the passageway 206.

Figure 3:
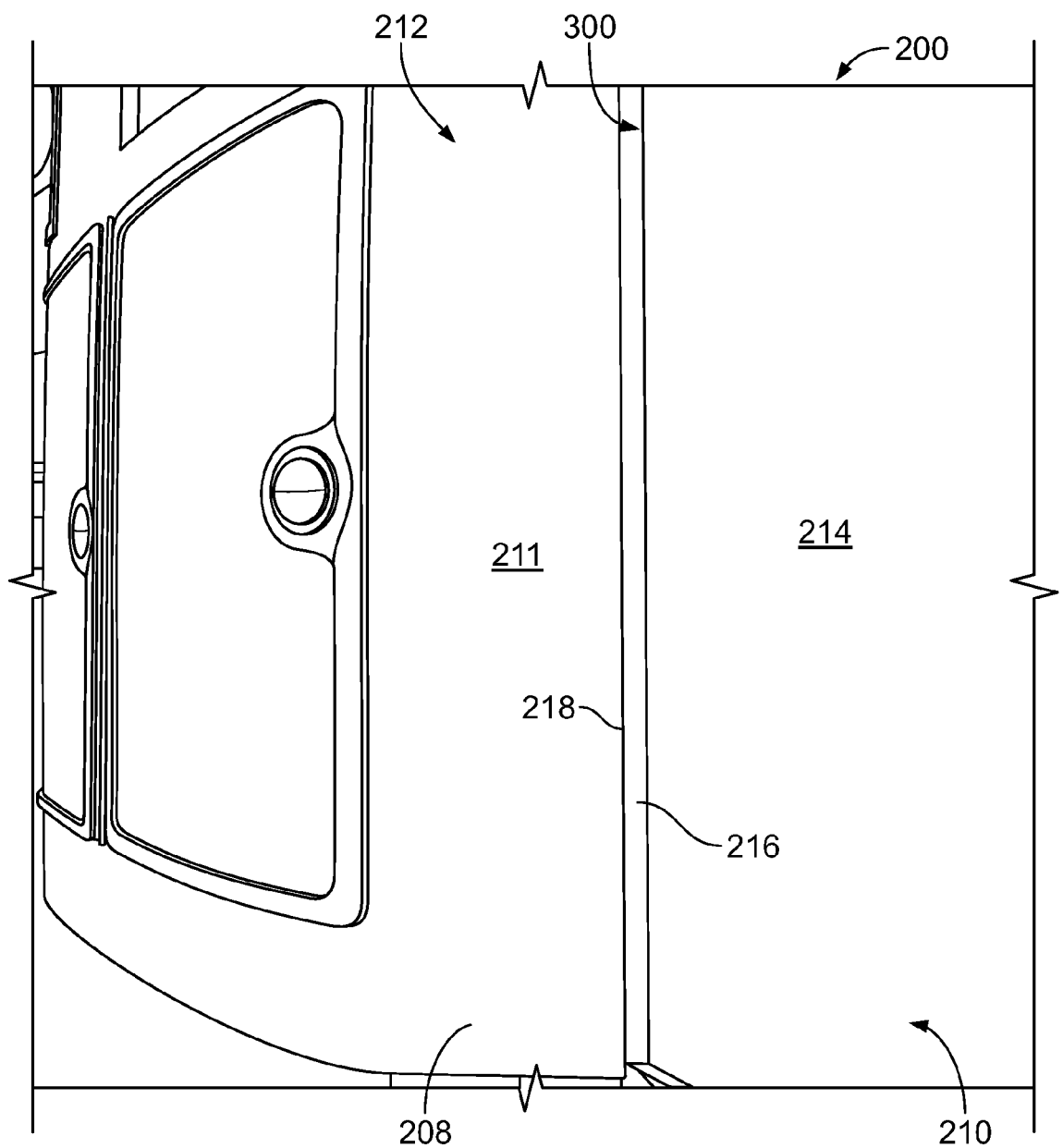
FIG. 3 illustrates an example illuminated area of the passageway storage unit of FIG. 2.
Figure 9:
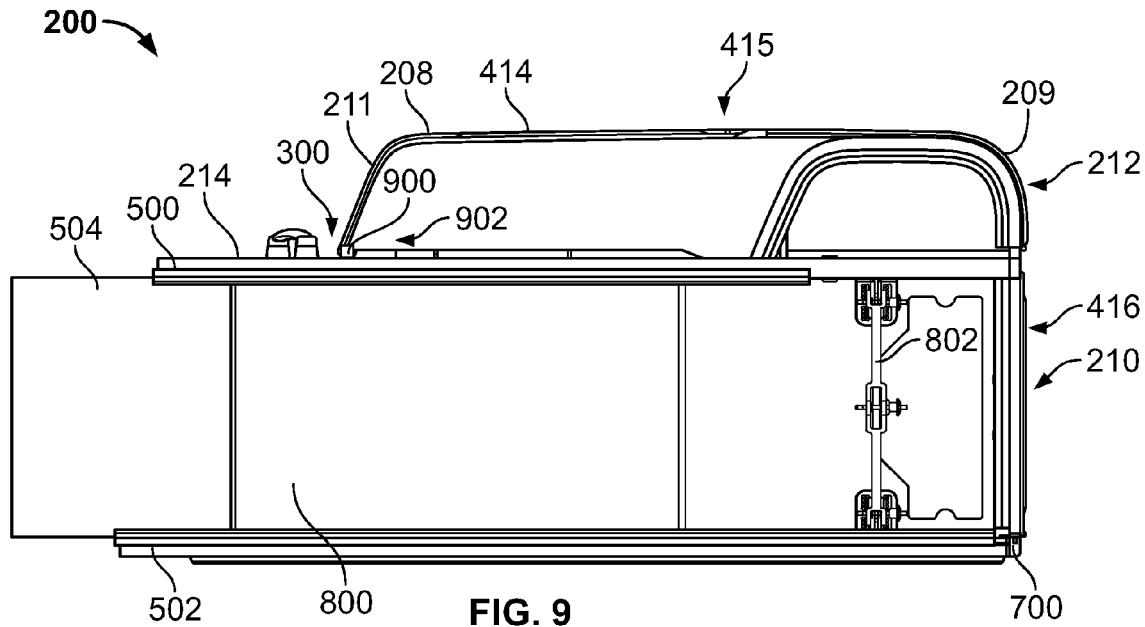
FIG. 9 is a top view of the example passageway storage unit of FIGS. 2-8.

FIG. 3 illustrates an example technique to illuminate the area 216. In the illustrated example, the edge 218 of the second storage assembly 212 is spaced apart from the first front face 214 of the first storage assembly 210 to form a gap 300 between the edge 218 and the first front face 214. As best shown in FIG. 9, the passageway storage unit 200 includes a slot or recess 902, and the light 900 is disposed in the recess 902 to direct light through the gap 300 and/or onto the first front face 214 of the first storage assembly 210 to illuminate the area 216. Other examples illuminate the area 216 in other ways (e.g., the light 900 may be disposed on the first side 211). In some examples, the light 900 includes one or more light emitting diodes (LEDs).

Figure 4:
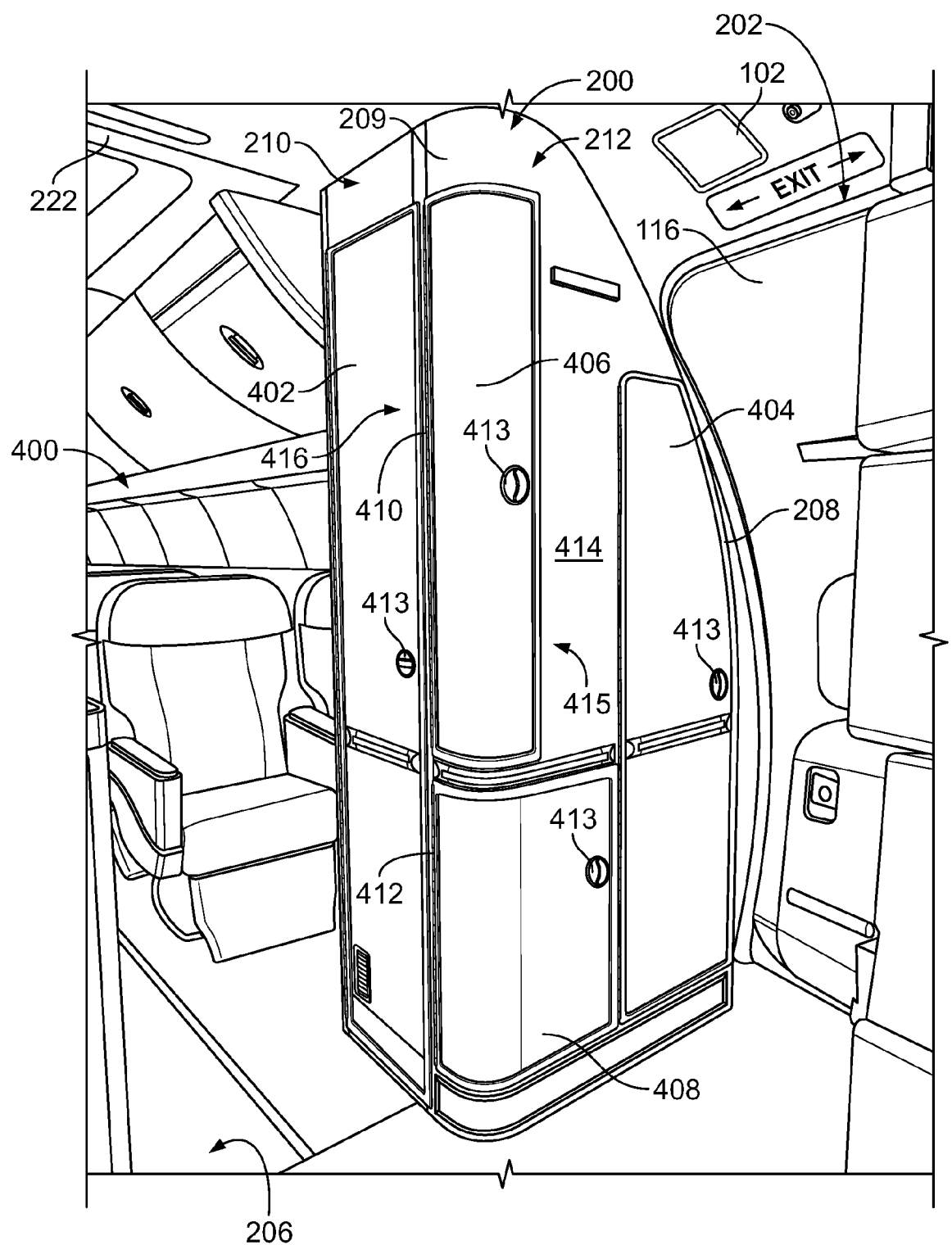
FIG. 4 is a perspective view of the example passageway storage unit of FIGS. 2-3 having a curved corner adjacent an aisle between a passenger seating area and an entranceway of the aircraft.

FIG. 4 is a perspective view of the example passageway storage unit 200. The example passageway storage unit 200 is disposed adjacent the passageway 206 between a passenger seating area 400 and the entranceway 202 and/or the door 116. The example passageway storage unit 200 defines a portion of the passageway 206. For example, in the illustrated example, the first storage assembly 210 includes a first compartment accessible via a first door 402. The example second storage assembly 212 includes a second compartment, a third compartment and a fourth compartment. The second compartment is accessible via a second door 404, the third compartment is accessible via a third door 406, and a fourth compartment is accessible via a fourth door 408. In other examples, the passageway storage unit 200 has other numbers of compartments and/or doors. The example compartments may be used to store and/or retain any item(s) such as, for example, garments (e.g., coats, jackets, hats, and/or any other garment), safety equipment (e.g., fire extinguishers, first aid kits, and/or any other safety equipment), supplies (e.g., blankets, paper towels, soap, food, and/or any other supplies) and/or any other items. In some examples, shelving, brackets, racks (e.g., a coat rack), dividers, padding and/or any other structures and/or devices to hold, support, organize and/or protect the items are disposed in compartments.

In the illustrated example, the second storage assembly 212 defines the second curved corner 209. In the illustrated example, the third door 406 and the fourth door 408 each includes a curved section to define a portion of the second curved corner 209. Thus, at least a portion of each of the example third door 406 and the example fourth door 408 are curved. In the illustrated example, the third door 406 and the fourth door 408 include hinges 410, 412 adjacent and/or disposed on the first storage assembly 210 to enable the third door 406 and the fourth door 408 to open away from the left side 104 and/or the entranceway 202 of the fuselage 102 (e.g., the third door 406 and the fourth door 408 open into and/or toward the right side 106 of the fuselage 102 and/or the passenger seating area 400), thereby facilitating access to the third compartment and the fourth compartment and enabling the passengers and/or the crew to close the third door 406 and/or the fourth door 408 as the passengers and/or the crew exit the aircraft 100 from the passenger seating area 400. In the illustrated example, the hinges 410, 412 enable the third door 406 and the fourth door 408, respectively, to pivot about an axis that is substantially vertical and/or perpendicular to the floor 220. In some examples, the hinges 410, 412 are coupled to respective ends of the third door 406 and the fourth door 408. In other examples, the third door 406 and the fourth door 408 open in other directions and/or via other devices (e.g., rollers). In some examples, one or more of the compartments is not covered by a door. In the illustrated example, each of the doors 402, 404, 406, 408 include a latch 413 to secure the doors 402, 404, 406, 408 in a closed position and facilitate opening and closing of the doors 402, 404, 406, 408. The example latches 413 may be disposed in any location on and/or near (e.g., operatively coupled to) the doors 402, 404, 406, 408.

Figure 16:
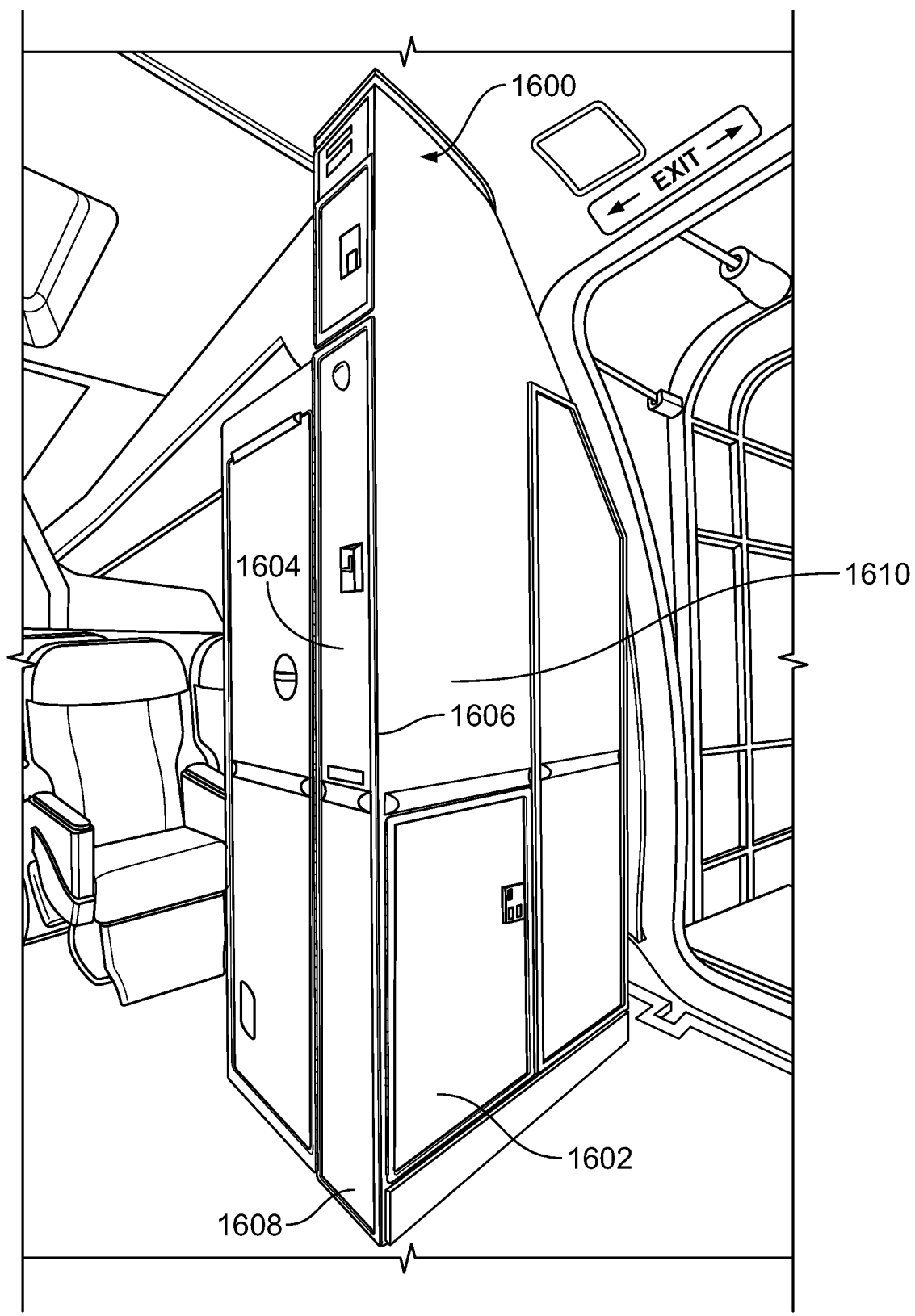
FIG. 16 illustrates a traditional storage unit.

The example third door 406 and the example fourth door 408 each formed as a portion of the second curved corner 209 permit relatively greater access to the contents of the third and fourth compartments when compared to traditional storage units such as the traditional storage unit 1600 of FIG. 16. The example fourth door 408 also includes a substantially planar section defining a portion of a second front face 414 of the second storage assembly 212. In some examples, the second front face 414 is substantially planar. In some examples, the front face 414 is shaped in other way. In the illustrated example, openings to the third compartment and/or the fourth compartment are defined by a second side 415 of the passageway storage unit 200, the second curved corner 209 and a third side 416 of the passageway storage unit 200. In the illustrated example, the second curved corner 209 adjoins the second side 415 and the third side 416 of the passageway storage unit 200. Thus, when the example third door 406 and/or the fourth door 408 of the example passageway storage unit 200 are in an open position (e.g., a fully open position), openings to the third compartment and/or the fourth compartment extend from the second front face 414 of a second side 415 of the passageway storage unit 200 and around the second curved corner 209 to a third side 416 of the passageway storage unit 200. Thus, the openings of the third compartment and/or the fourth compartment are larger than if the third door 406 and/or the fourth door 408 did not form a portion of the second curved corner 209. In addition, the third door 406 and/or the fourth door 408 in the open position enable the passengers and/or the crew to access the contents of the third compartment and/or the fourth from around the second curved corner 209 without obstruction from a wall of the passageway storage unit 200. To the contrary, doors 1602, 1604 of the traditional storage unit 1600, shown in FIG. 16, that cover compartments on a corner 1606 of the traditional storage unit 1600 do not extend around the corner 1606. As a result, when the doors 1602, 1604 are in an open position, walls 1608, 1610 of the traditional storage unit 1600 around the corner 1606 from the doors 1602, 1604 obstruct access to compartments if the passenger and/or the crew are positioned in front of the walls 1608, 1610.

In addition, the first curved corner 208 and the second curved corner 209 provide relatively greater ease of entrance and egress from the passageway 206 when compared to the traditional storage unit 1600. For example, the first curved corner 208 and the second curved corner 209 enable the passengers and/or the crew to make a more gradual turn into the and out of the passenger seating area 400 than the corner 1606 of the traditional storage unit 1600, which is sharp and/or angled. In addition, the first curved corner 208 and the second curved corner 209 of the example passageway storage unit 200 are less likely to impede movement of the passengers and/or the crew and/or snag carts, luggage and/or baggage (e.g., suitcases, purses, etc.) and/or handheld items (e.g., coats, pillows, etc.) moved by the passengers and/or the crew through the aisle 206 than the corner 1606 of the traditional storage unit 1600.

Figure 5:
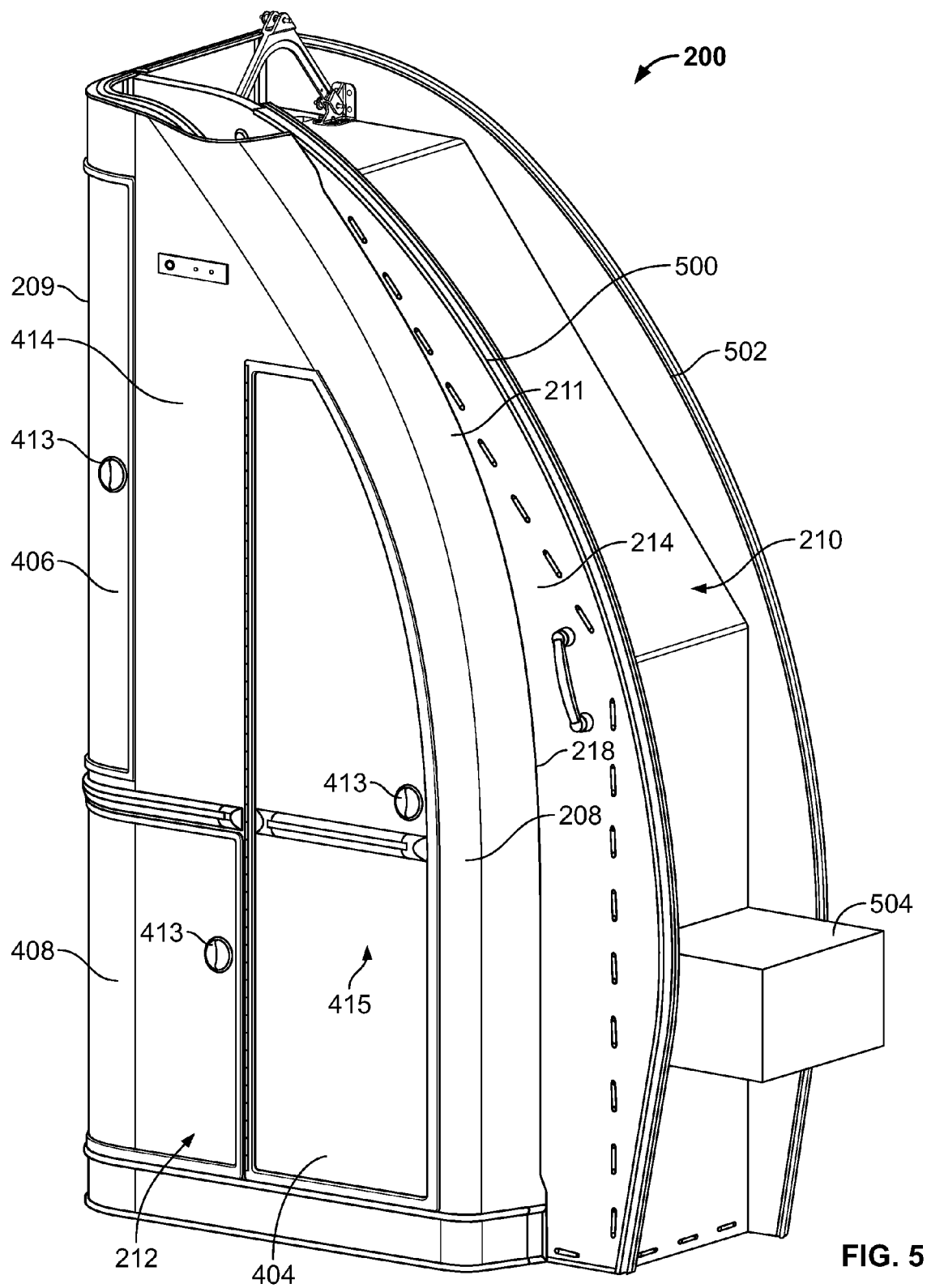
FIG. 5 is another perspective view of the example passageway storage unit of FIGS. 2-4.

FIG. 5 is a perspective view of the example passageway storage unit 200 of FIGS. 2-4. In the illustrated example, as indicated above, the second storage assembly 212 includes the first side 211 having the first curved corner 208. The example first side 211 extends substantially from the floor 220 of the interior 204 to the ceiling 222 of the interior 204. In the illustrated example, the first side 211 curves about a plurality of axes. For example, the first side 211 is curved from the second front face 414 of the second storage assembly 212 toward the tail end 110 of the aircraft to define the first curved corner 208. The example first side 211 also curves from the floor 220 toward the right side 106 of the fuselage (e.g., away from the passageway 206). In the illustrated example, a radius of curvature of the first side 211 toward the right side 106 of the fuselage decreases along the first side 211 from the floor 220 toward the ceiling 222. In other examples, the first side 211 is other shapes.

The example first storage assembly 210 includes a first wall 500 and a second wall 502 opposite the first wall 500. The example first wall 500 defines the first front face 214. In the illustrated example, the first wall 500 and the second wall 502 are coupled to the fuselage 102. In the illustrated example, the first wall 500 and the second wall 502 are shaped (e.g., curved) to substantially conform to a shape (e.g., curvature) of the left side 104 of the fuselage 102. In other examples, the first wall 500 and the second wall 502 are other shapes. In the illustrated example, insulation 504 (e.g., a fire or heat insulation block) is disposed between the first wall 500 and the second wall 502.

Figure 6:
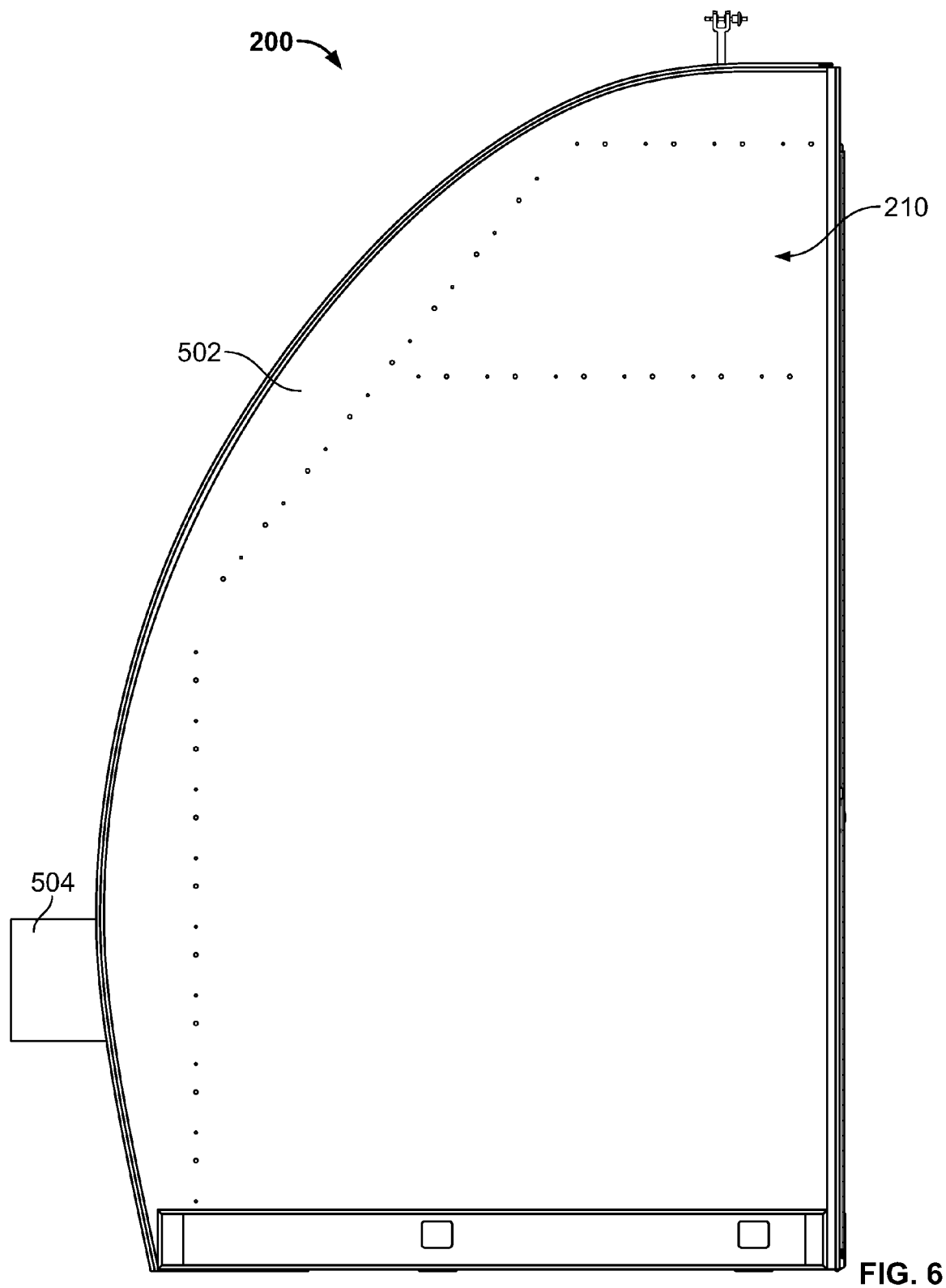
FIG. 6 illustrates an example wall of the passageway storage unit adjacent a passenger seating area of the aircraft 100 of FIG. 1.

FIG. 6 illustrates the example second wall 502. In some examples, the second wall 502 is disposed in the passenger seating area 400 and includes one or more shelves, baskets, television screens, monitors, signs, garment hangers, tray tables, and/or other items.

FIG. 7 is a first side view of the example passageway storage unit 200 illustrating the example second curved corner 209 and the first door 402 of the first storage assembly 210. The example first storage assembly 210 has a third corner 700 that the passengers and/or crew pass as the passengers and/or crew move passed the first storage assembly 210. In the illustrated example, the third corner 700 has a smaller radius of curvature than the second curved corner 209. In other examples, the third corner 700 is curved and has a radius similar or equal to the radius of curvature of the second curved corner 209. In some examples, the third corner 700 has a greater radius of curvature than the second curved corner 209. In the illustrated example, the first door 402 does not extend around the third corner 700. In other examples, the first door 402 may extend around at least a portion of the third corner 700 and, thus, defines at least a portion of the third corner 700. In the illustrated example, the first door 402 opens away from the entranceway 202 of the fuselage 102 and/or toward the passenger seating area 400 (e.g., to the left in the orientation of FIG. 7) via a hinge 702 adjacent and/or disposed on the third corner 700. In other examples, the first door 402 opens away from the passenger seating area 400 (e.g., to the right in the orientation of FIG. 7) via a hinge disposed adjacent the hinges 410, 412 of the third door 406 and/or the fourth door 408. In this regard, latch 413 may be positioned on the second wall 502 of the first storage assembly 210.

FIG. 8 is a second side view of the example passageway storage unit 200 illustrating the example first side 211 of the second storage assembly 212 and a housing 800 of the first storage assembly 210. In the illustrated example, a V-shaped bracket 802 is coupled to the housing 800 to couple the passageway storage unit 200 to the ceiling 222 and/or the fuselage 102. In other examples, the passageway storage unit 200 is coupled to the ceiling 222 and/or the fuselage 102 in other ways. In the illustrated example, the housing 800 defines the first compartment.

FIG. 9 is a top view of the example passageway storage unit 200. In the illustrated example, the second storage assembly 212 has a first depth (e.g., a distance from the second front face 414 to the first front face 214) of 6.6 inches. In other examples, the second storage assembly 212 has other depths. In some examples, a radius of curvature of the first curved corner 208 is similar to or equal to the first depth and/or a depth of one or more of the compartments of the example second storage assembly 212. For example, the first radius of curvature may be approximately five inches, and the first depth of the second storage assembly 212 and/or the depth of the one or more compartments may be approximately five inches. However, the above-noted dimensions are merely examples and, thus, other dimensions may be used without departing from the scope of this disclosure. The example first storage assembly 210 has a second depth (e.g., a distance between the first wall 500 and the second wall 502) greater than the first depth. In other examples, the second depth is equal to or less than the first depth.

Figure 10:
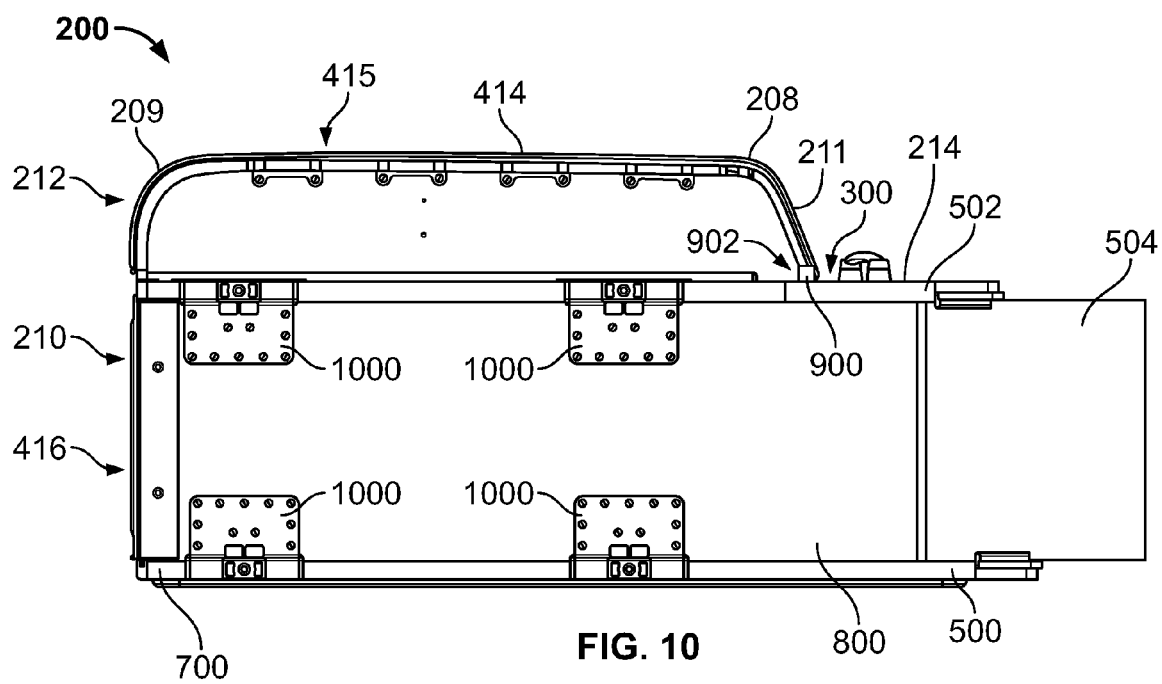
FIG. 10 is a bottom view if the example passageway storage unit of FIGS. 2-9.

FIG. 10 is a bottom view of the example passageway storage unit 200. In the illustrated example, the passageway storage unit 200 is coupled to and/or supported on the floor 220 of the interior 204 via four feet 1000 disposed on the first storage assembly 210. In other examples, the passageway storage unit 200 has other numbers of the feet 1000 and/or the feet 1000 are disposed on other portions of the passageway storage unit 200 such as, for example, the second storage assembly 212. In some examples, the passageway storage unit 200 is supported on and/or coupled to the floor 220 in other ways.

Figure 11:
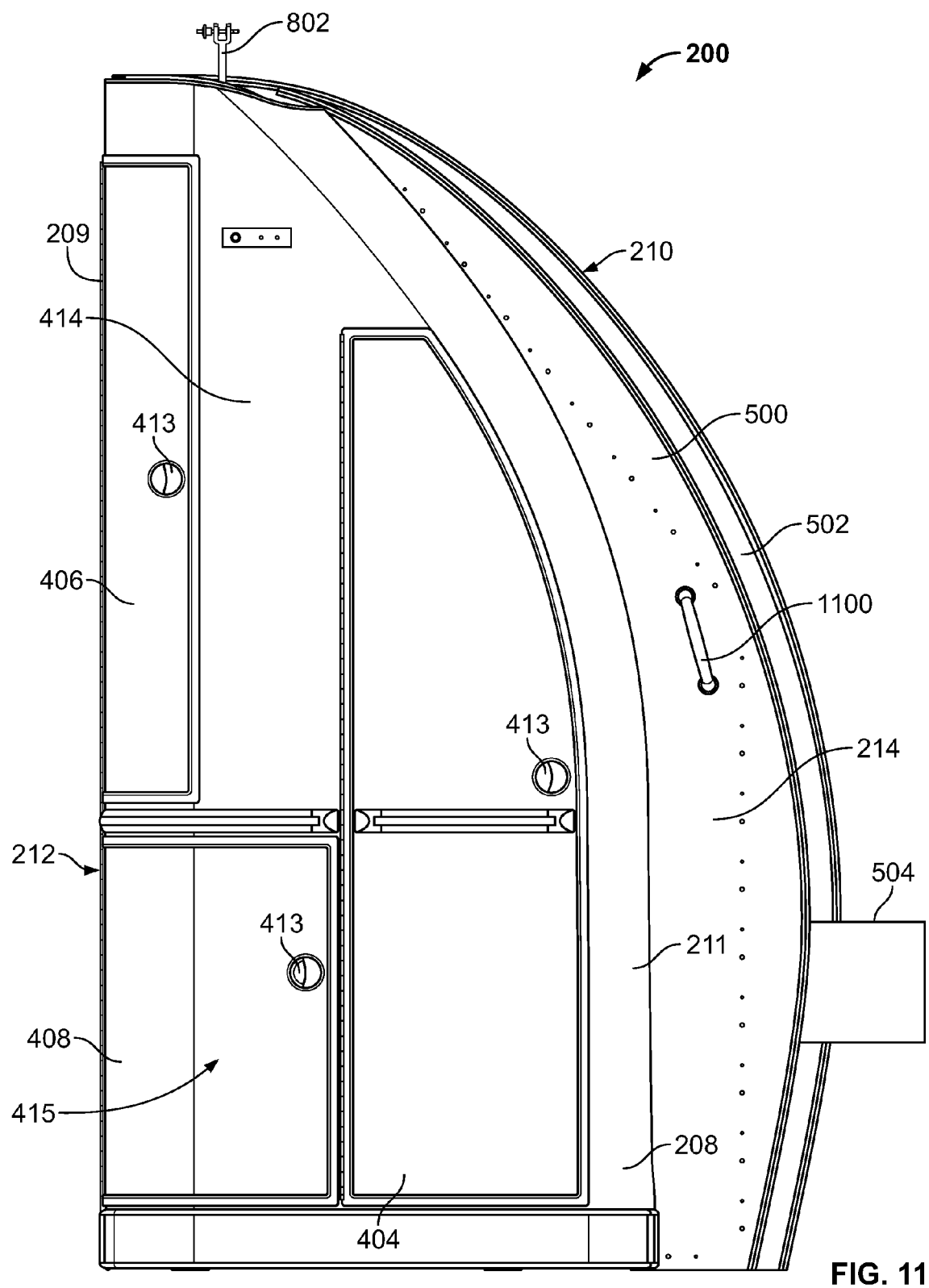
FIG. 11 is a front view of the example passageway storage unit of FIGS. 2-10.

FIG. 11 is a front view of the example passageway storage unit 200 of FIGS. 2-10. In the illustrated example, a handle 1100 is coupled to the first wall 500. The passengers and/or the crew may grasp and/or hold the handle 1100 to facilitate boarding and/or disembarking the aircraft 100.

Figure 13:
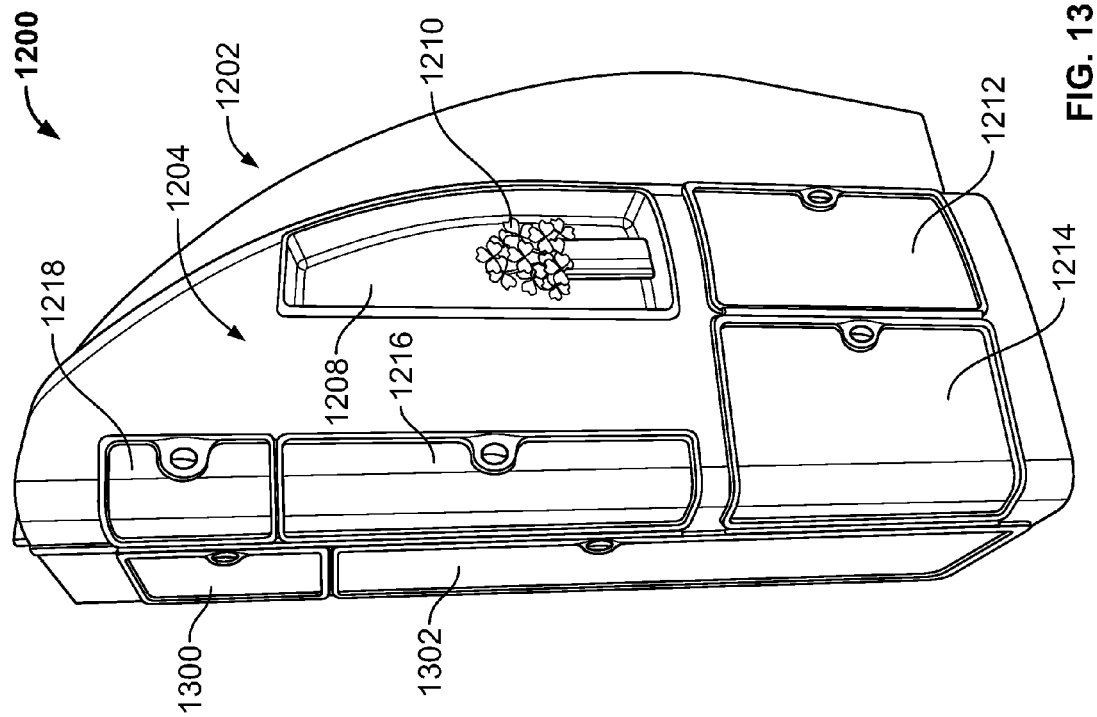
FIG. 13 is another perspective view of the example passageway storage unit of FIG. 12.
Figure 12:
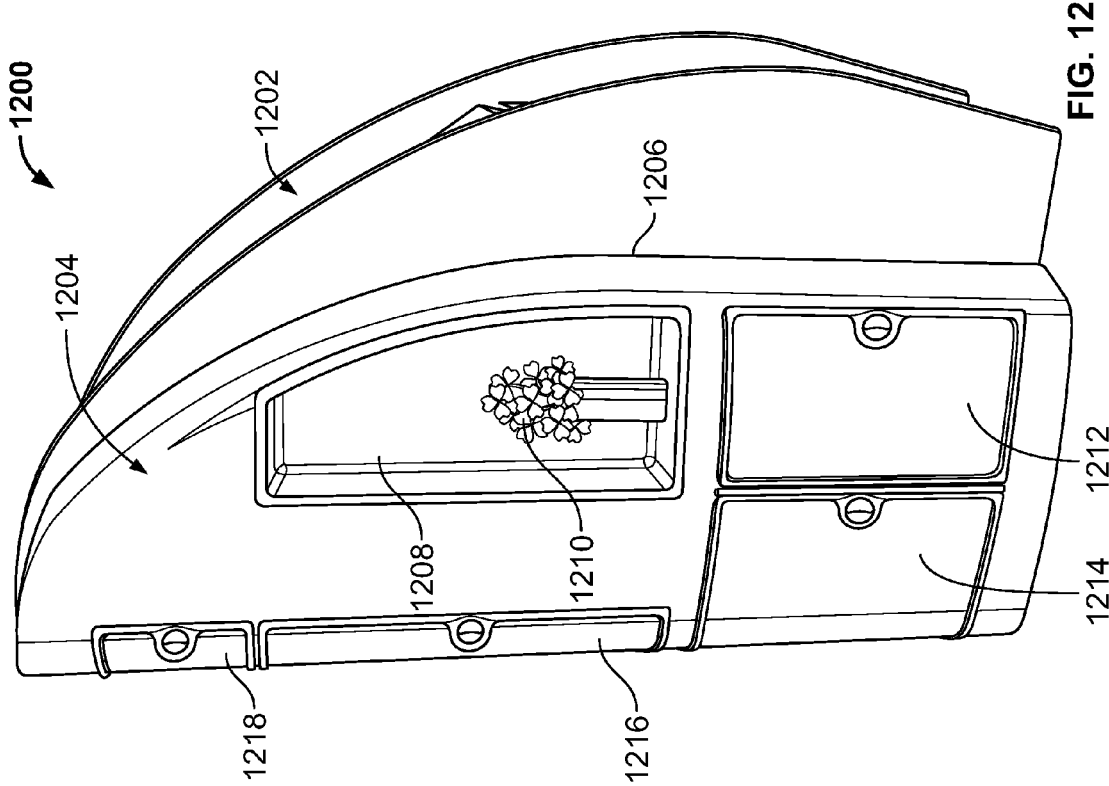
FIG. 12 is a perspective view of another example passageway storage unit disclosed herein having an example cavity.

FIGS. 12 and 13 are perspective views of another example passageway storage unit 1200 disclosed herein, which may be used to implement the example aircraft 100 of FIG. 1. In the illustrated example, the passageway storage unit 1200 includes a first storage assembly 1202 and a second storage assembly 1204. The example second storage assembly 1204 is coupled to the first storage assembly 1202. In the illustrated example, an area 1206 on the first storage assembly 1202 adjacent the second storage assembly 1204 is illuminated. In some examples, the area 1206 is illuminated using technique(s) similar or identical to the example illuminated area 216 of FIG. 2 and/or FIG. 3.

In the illustrated example, the second storage assembly 1204 includes a recess or cavity 1208. In the illustrated example, a plant 1210 is disposed in the cavity 1208. In other examples, other items may be disposed in the cavity 1208. For example, the cavity 1208 may include lights, shelves (FIGS. 18-19), movable tray tables (FIGS. 17-19), one or more cabinets, an electronic display screen (FIGS. 20-21) (e.g., a television, a tablet, a computer monitor, etc.), one or more signs, advertisements, posters, pictures, planters and/or plants, artwork, supplies, food and/or beverage containers and/or any other item(s). In some examples, information (e.g., airline name, flight number, flight destination, safety information and/or any other information) and/or media (e.g., movies, pictures, websites and/or any other media) is displayed in the cavity 1208. The example cavity 1208 may be any shape and/or size. In some examples, the passageway storage unit 1200 includes other numbers of cavities (e.g., 0, 2, 3, 4, etc.).

In the illustrated example, the second storage assembly 1204 includes four compartments accessible via respective doors 1212, 1214, 1216, 1218. In other examples, the second storage assembly 1204 includes other numbers of doors and/or compartments. Referring to FIG. 13, the example first storage assembly 1202 includes two compartments accessible via respective doors 1300, 1302. In other examples, the first storage assembly 1202 includes other numbers of doors and/or compartments. In some examples, the compartments of the first storage assembly 1202 and/or the second storage assembly 1204 include shelving, brackets, racks (e.g., a coat rack), dividers, padding, lights and/or any other structures and/or devices to hold, support, organize and/or protect and/or facilitate access to items in the compartments.

Figure 14:
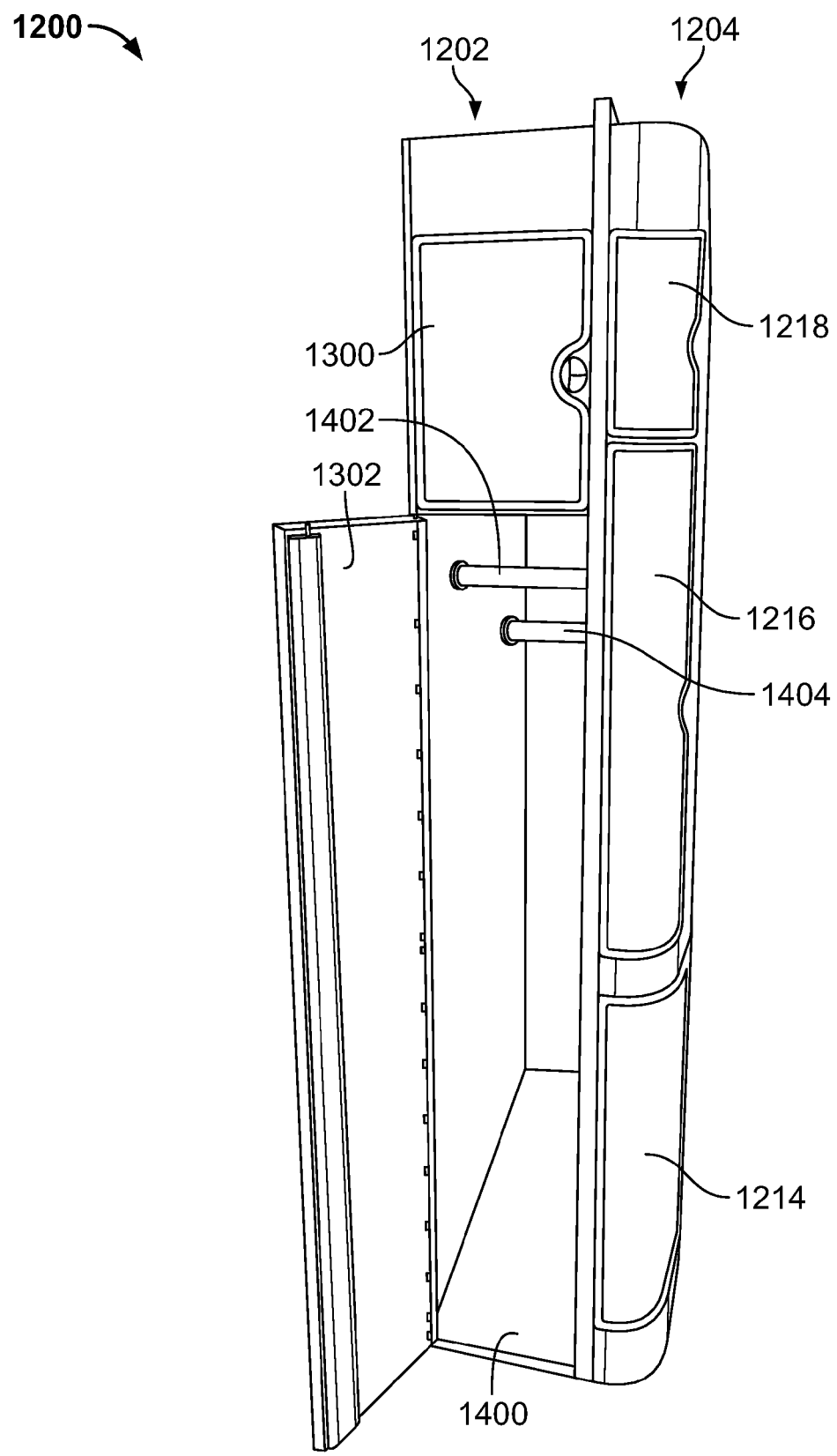
FIG. 14 is a side view of the example passageway storage unit of FIGS. 12-13.

FIG. 14 is a side view of the example passageway storage unit 1200 of FIGS. 12-13 illustrating an example compartment 1400 accessible via the door 1302. In the illustrated example, lights 1402, 1404 are disposed inside the compartment to illuminate the compartment. In some examples, some or all of the other compartments of the first storage assembly 1202 and/or the second storage assembly 1204 include one or more lights.

Figure 15:
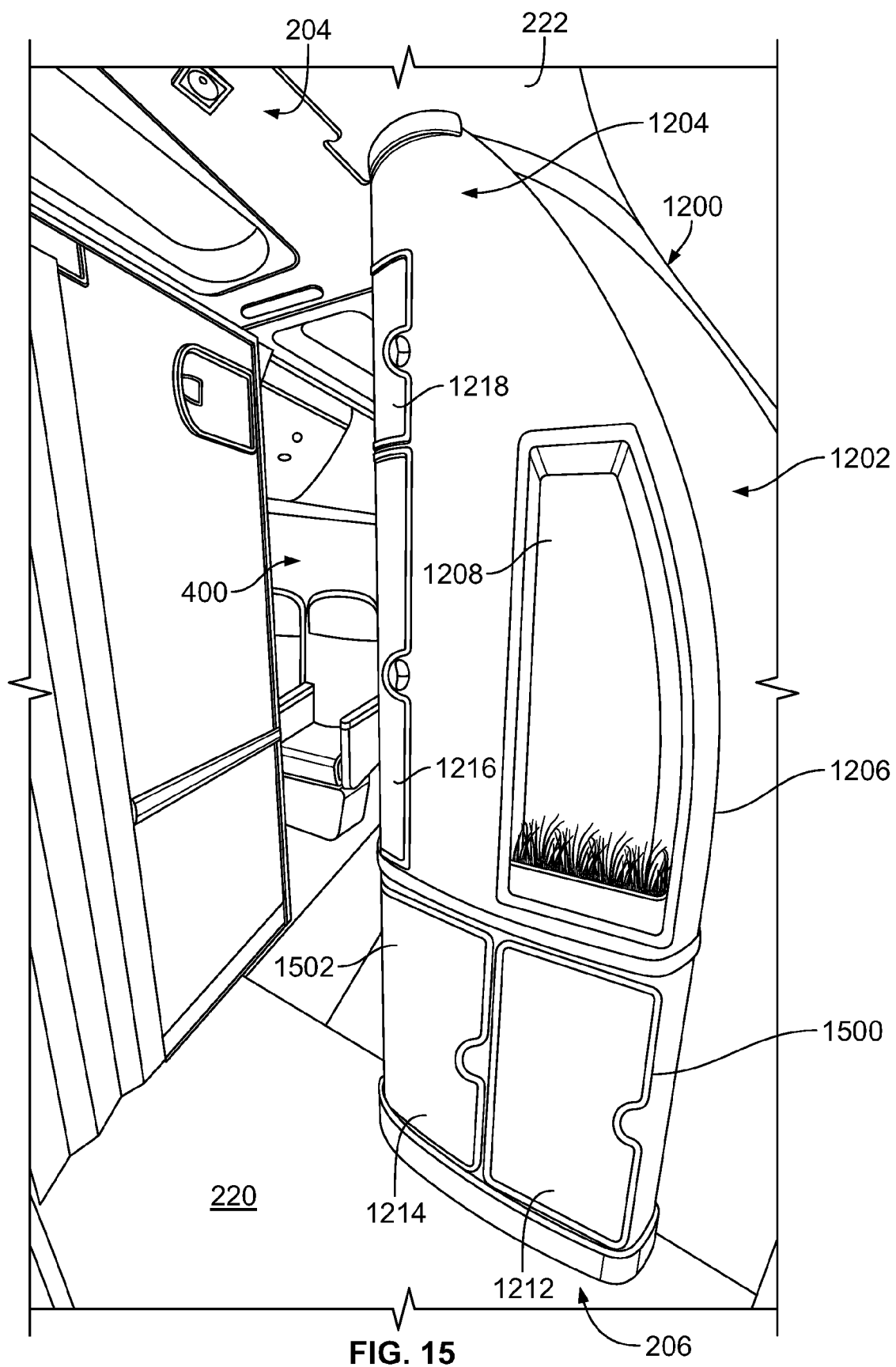
FIG. 15 illustrates the example passageway storage unit of FIGS. 12-14 disposed inside the example aircraft of FIG. 1.

FIG. 15 illustrates the example passageway storage unit 1200 of FIGS. 12-14 disposed inside the interior 204 of the example aircraft 100 of FIG. 1. The example passageway storage unit 1200 defines a first curved corner 1500 and a second curved corner 1502 adjacent the aisle 206 to enable the passengers and/or the crew to freely move around the passageway storage unit 1200. In some examples, a radius of curvature of the first curved corner 1500 and/or the second curved corner 1502 is similar to or equal to a depth of the second storage assembly 1204.

Figure 17:
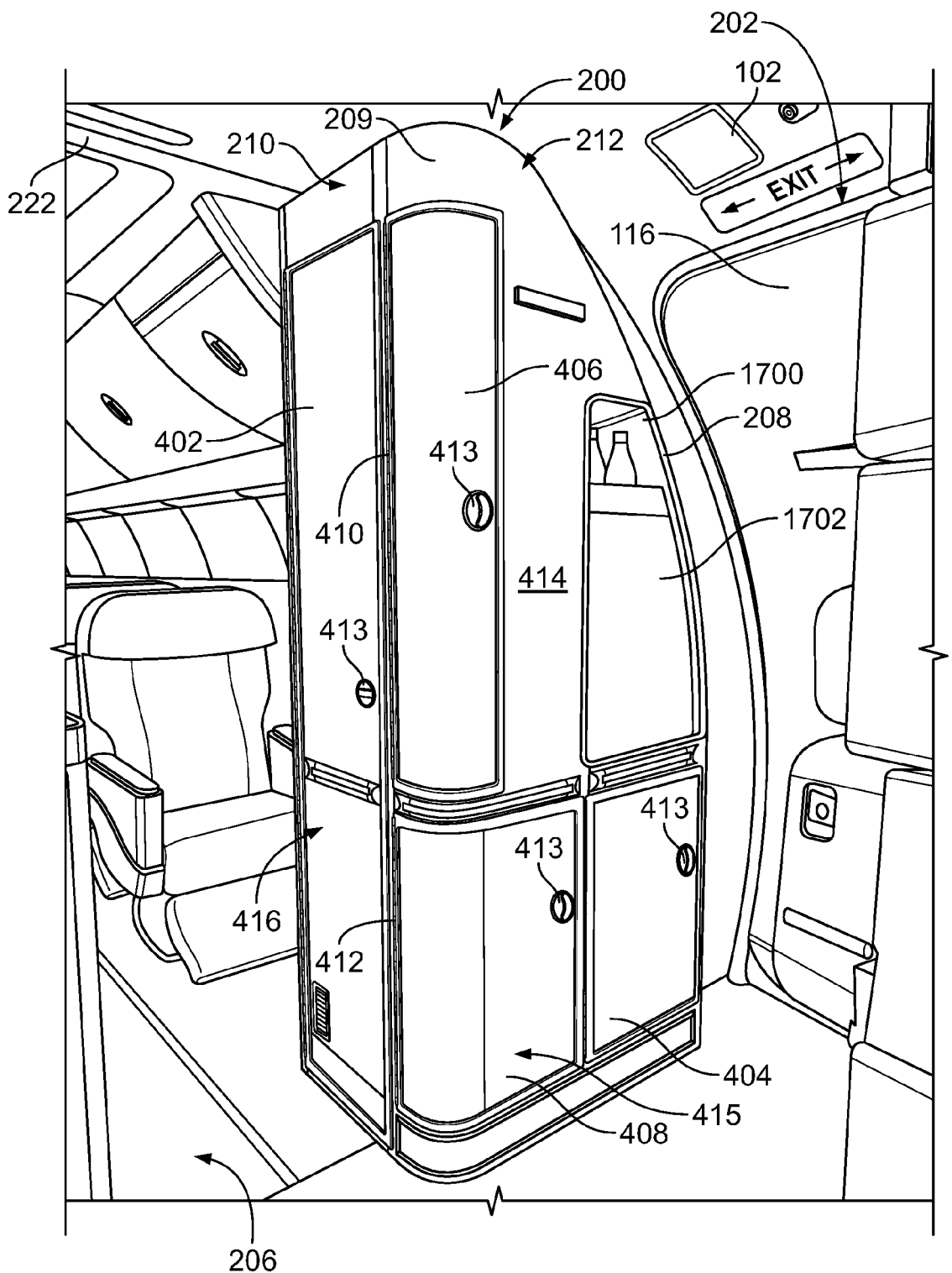
FIG. 17 illustrates the example passageway storage unit of FIG. 2 including an example cavity disclosed herein and an example tray table in an upright position.

FIG. 17 illustrates the example passageway storage unit of FIG. 2 having a cavity 1700 and a movable tray table 1702 disposed in the cavity 1700. In the illustrated example, the tray table 1702 is disposed in a retracted or upright position. The example tray table 1702 covers a first portion of the cavity 1700 when the tray table 1702 is in the upright position while enabling a second portion of the cavity 1700 to be accessible (e.g., uncovered). In some examples, the tray table 1702 includes a lock or latch to secure the tray table 1702 in the upright position.

Figure 18:
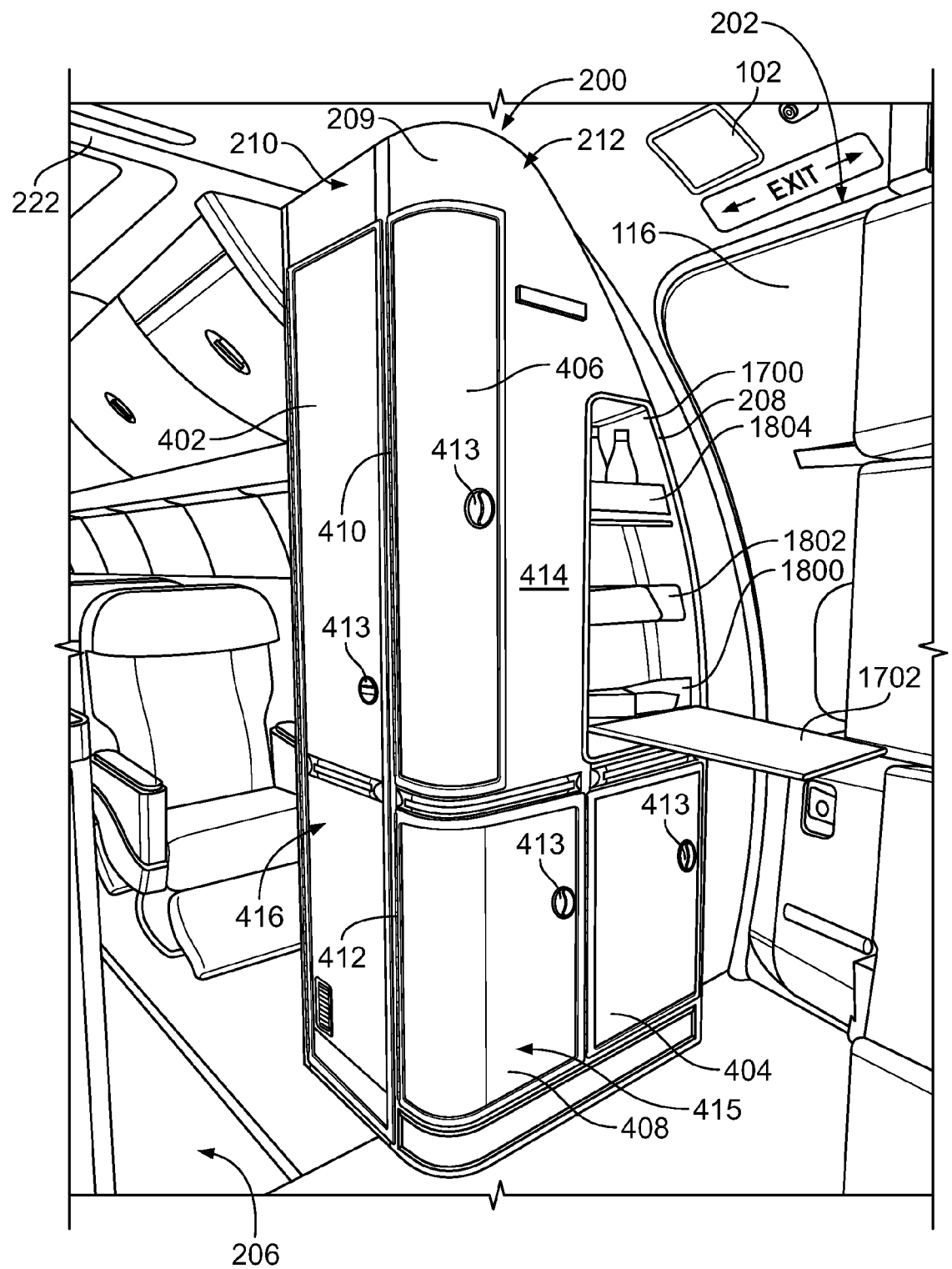
FIG. 18 illustrates the example passageway storage unit of FIG. 17 having the example tray table in a lowered position.

FIG. 18 illustrates the example passageway storage unit 200 of FIG. 17 having the tray table 1702 in a lowered or in-use position. In the illustrated example, shelves 1800, 1802, 1804 are disposed in the cavity 1700. In the illustrated example, items (e.g., baskets, bottles, and/or any other items) are stored and/or supported via the shelves 1800, 1802, 1804. When the tray table 1702 is in the lowered position, the first portion and the second portion of the cavity 1700 are accessible (e.g., uncovered).

Figure 19:
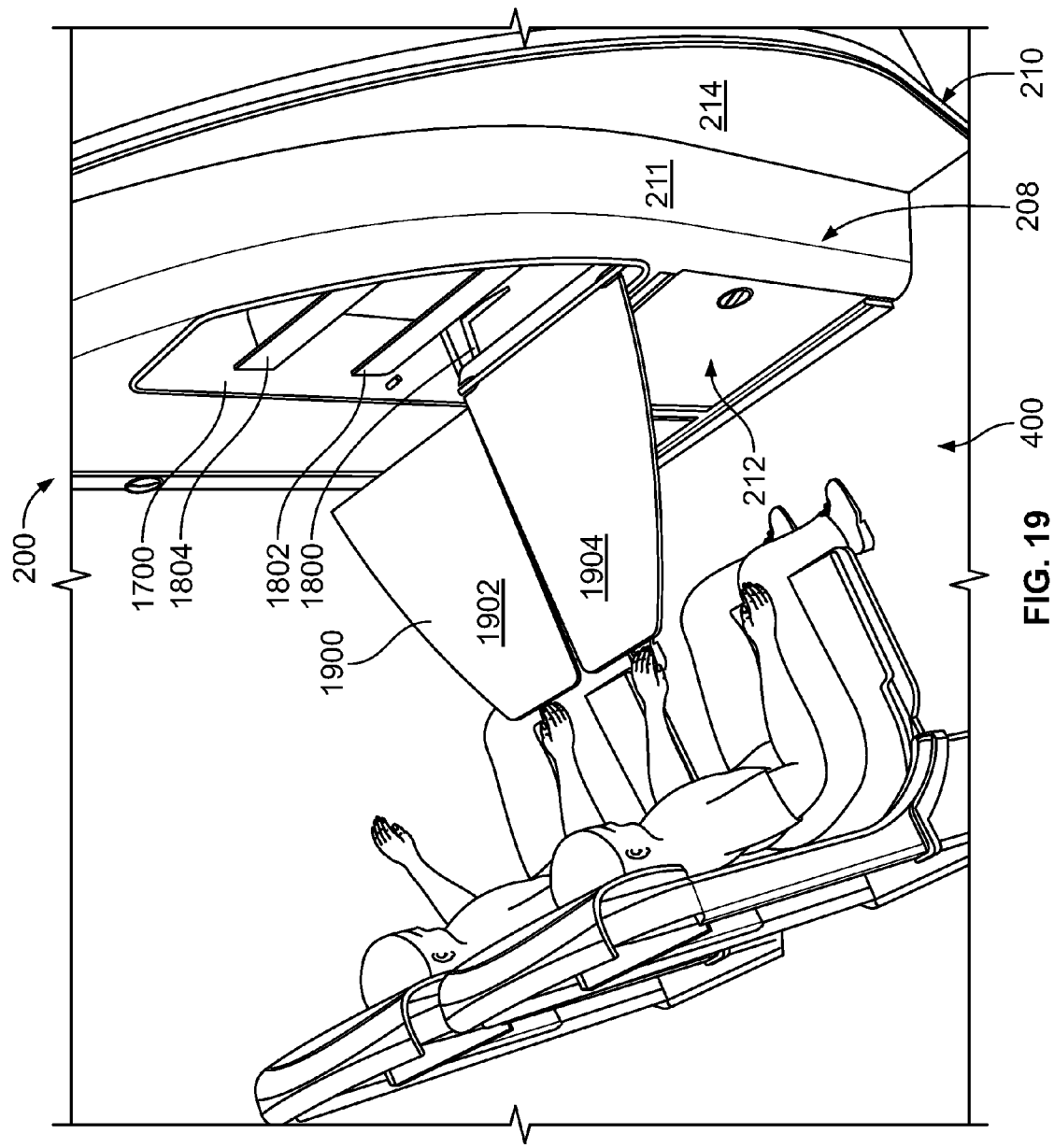
FIG. 19 illustrates the example passageway storage unit of FIG. 17 including another example tray table.

FIG. 19 illustrates the example passageway storage unit 200 including another example movable tray table 1900 disposed in the cavity 1700. In the illustrated example, the tray table 1900 includes a first tray 1902 rotatably coupled to a second tray 1904. In the illustrated example, the second tray 1904 is movably coupled to the second storage assembly 212 to enable the tray table 1900 to move between an upright position and a lowered position. The example tray table 1900 of FIG. 19 extends into the passenger seating area 400 of the fuselage 102 when the tray table 1900 is in the lowered position. In the illustrated example, when the tray table 1900 is in the lowered position, the first tray 1902 may be rotated between a closed position and an open position. When the first tray 1902 is in the closed position, the first tray 1902 is disposed in face-to-face juxtaposition with the second tray 1904 (e.g., the first tray 1902 covers at least a portion of the second tray table 1904). When the first tray is in the open position, the first tray 1902 is in side-to-side juxtaposition with the second tray 1904 (shown in FIG. 19) (e.g., upper surfaces of each of the first tray 1902 and the second tray 1904 are accessible), thereby increasing a surface area of the tray table 1900 usable by the passengers to and/or crew to, for example, support items such as, for example, one or more beverage containers on the tray table 1900.

Figure 20:
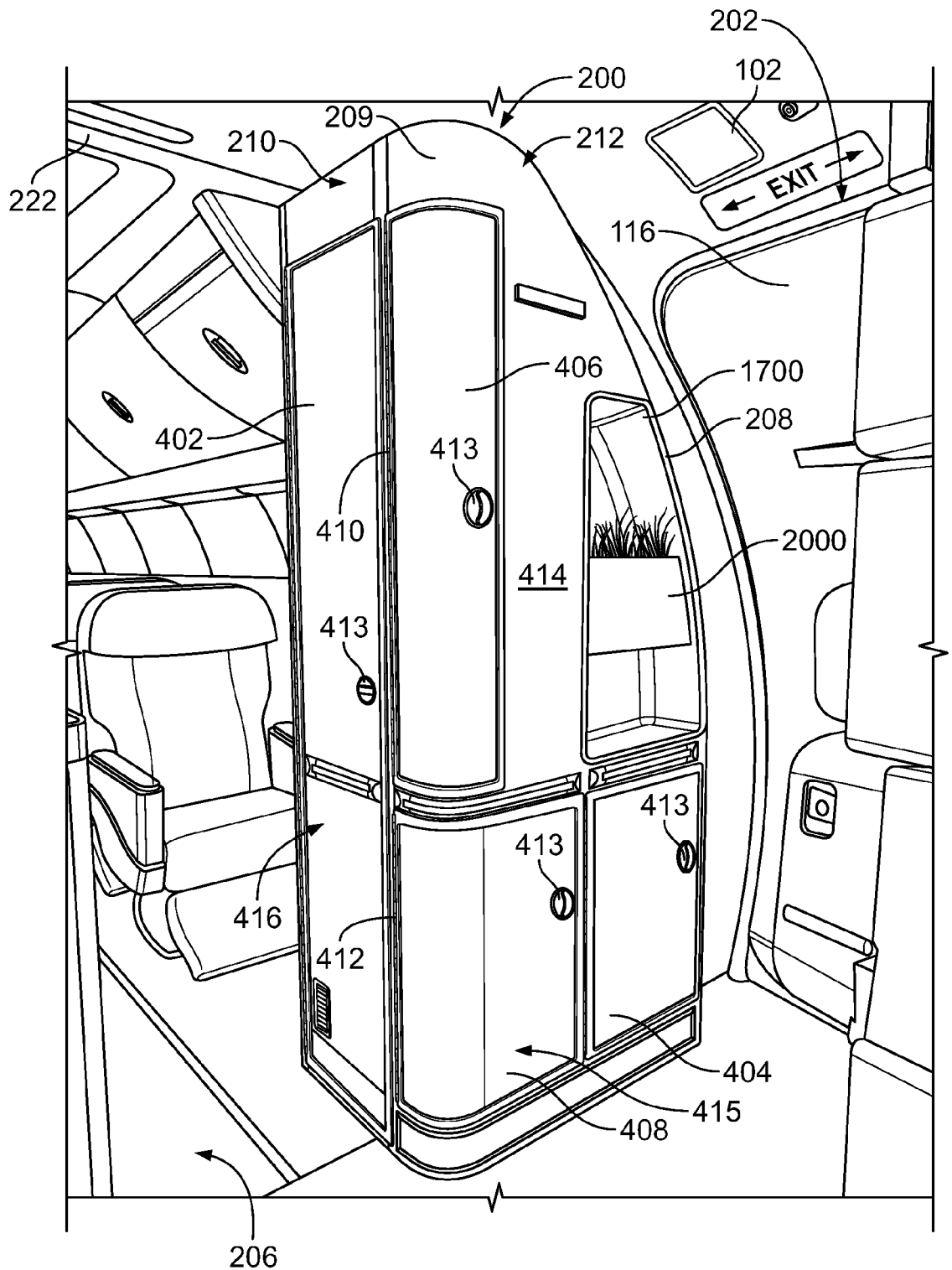
FIG. 20 illustrates the example passageway storage unit of FIG. 17 including an example planter disposed in the cavity.

FIG. 20 illustrates the example passageway storage unit 200 of FIG. 17 including an example pot or planter 2000 disposed in a middle section of the cavity 1700. In other examples, the planter 2000 is disposed in other positions in the cavity 1700.

Figure 21:
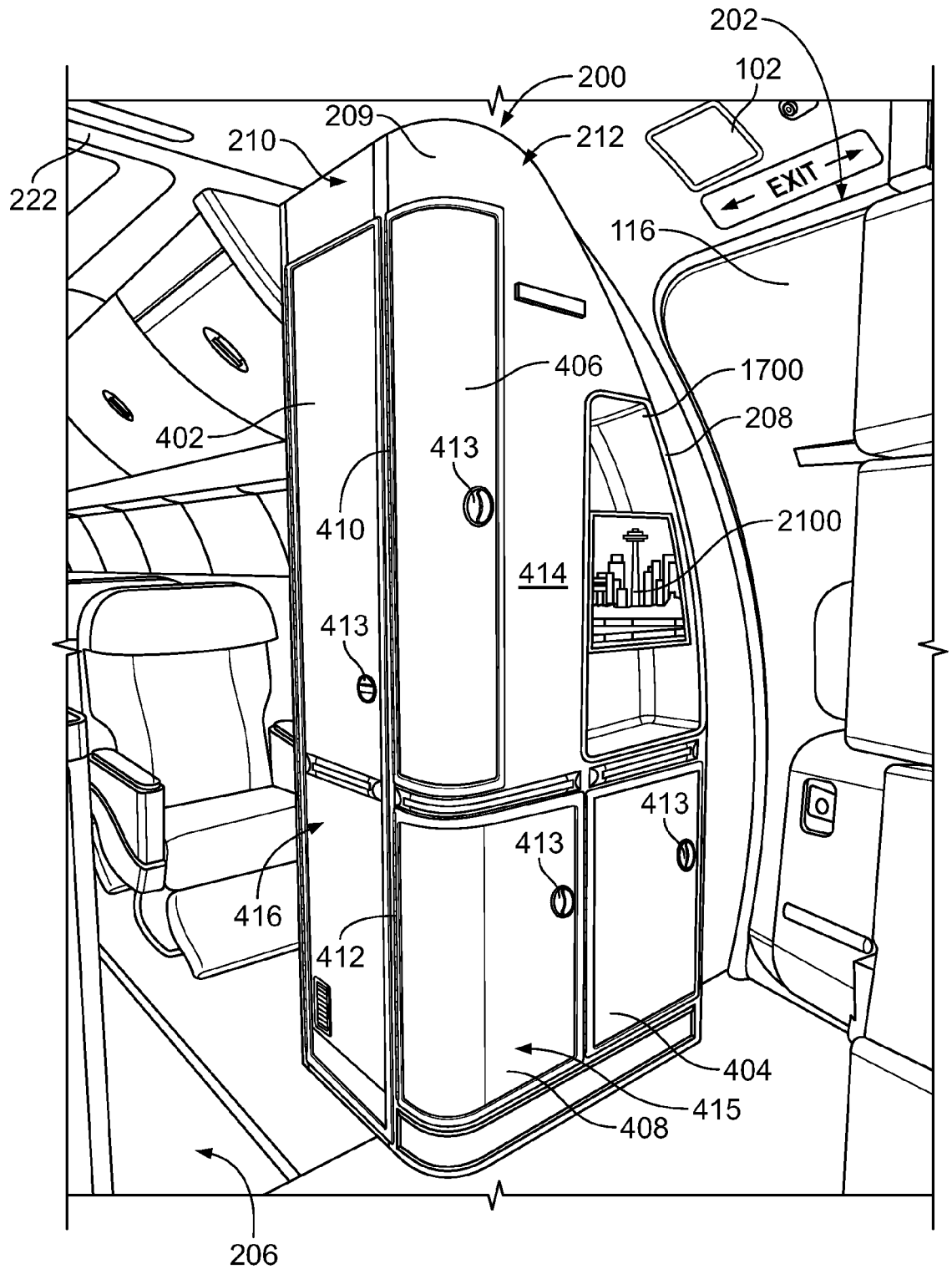
FIG. 21 illustrates the example passageway storage unit of FIG. 17 including an example electronic display screen disposed in the cavity.

FIG. 21 illustrates the example passageway storage unit 200 of FIG. 17 including an example electronic display screen 2100. The example electronic display screen 2100 may be used to display pictures, videos, advertisements, information, media, etc. In some examples, the electronic display screen 2100 is user-interactive. For example, the electronic display screen 2100 may be a tablet having a touchscreen that a technician, the passengers and/or the crew may use to, for example, display a selected image and/or video via the electronic display screen 2100.

Figure 22:
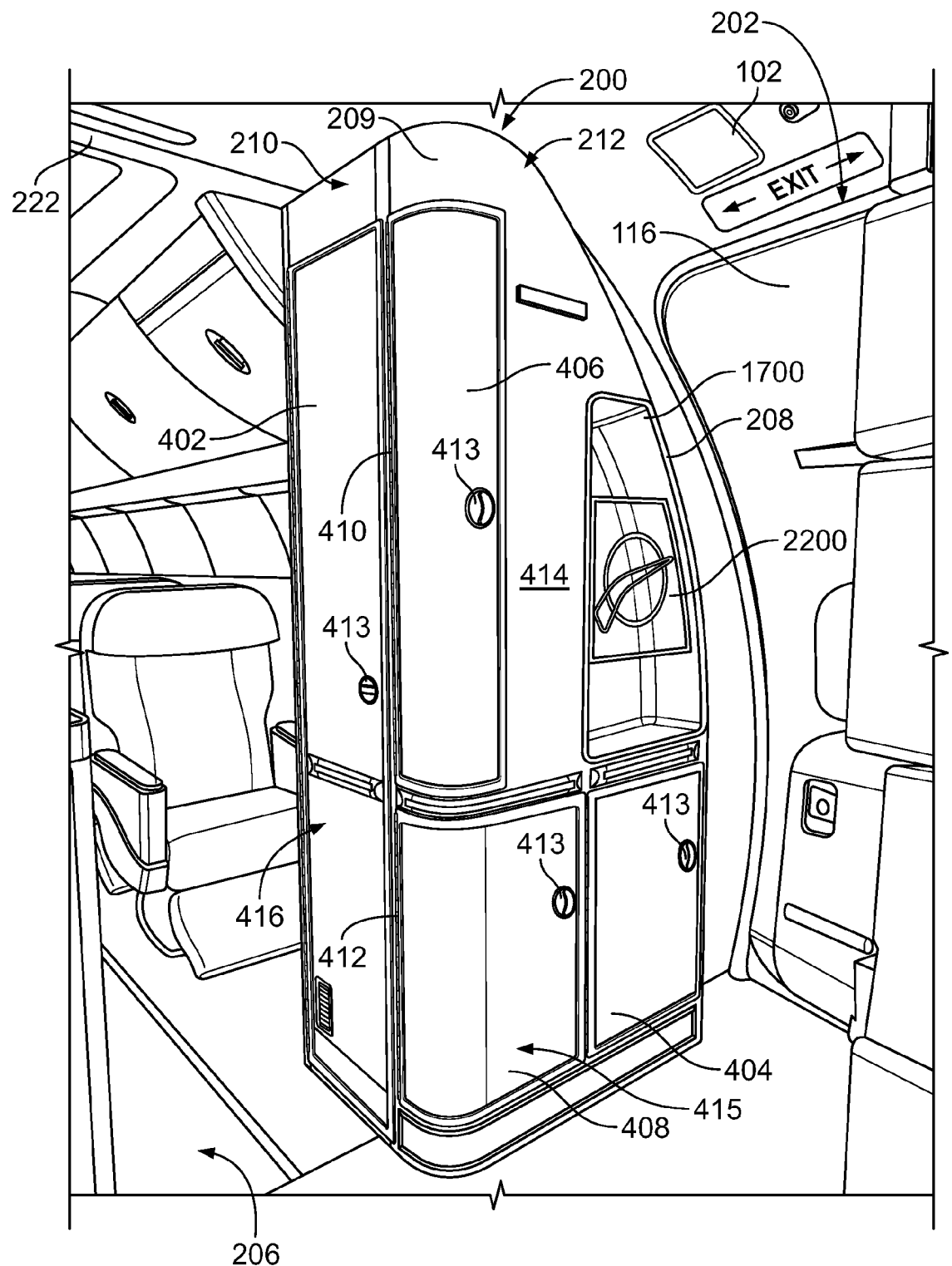
FIG. 22 illustrates the example passageway storage unit of FIG. 17 including an example sign disposed in the cavity.

FIG. 22 illustrates the example passageway storage unit 200 of FIG. 17 including an example sign 2200 disposed in the cavity 1700. In the illustrated example, the example sign 2200 is an illuminated panel. In other examples, other types of signs may be used.

From the foregoing, it will be appreciated that the above disclosed aircraft passageway storage units enable passengers and/or crew of an aircraft to easily and/or freely move between an entranceway and a seating area of the aircraft. The example passageway storage units also enable items and/or supplies to be conveniently stored and/or accessed via compartments of the passageway storage units. In some examples, the passageway storage units include cavities to include and/or display one or more items.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a passageway storage unit including a storage compartment, the passageway storage unit to be supported on an interior floor of a fuselage of an aircraft, the passageway storage unit having a first side, a curved first corner, and a second side to define a portion of a passageway in the fuselage; and
a compartment door coupled to the passageway storage unit to selectively cover the storage compartment, the compartment door having a first end disposed on the first side and a second end disposed on the second side when the compartment door is in a closed position and a curved section extending between the first end and the second end, the curved section defining a portion of the curved first corner, a position of the curved section to move relative to the first side when the compartment door is moved from the closed position to a fully open position, the storage compartment having an opening extending from the first side to the second side of the passageway storage unit when the compartment door is in the fully open position.

2. The apparatus of claim 1, wherein the first end is to be pivotably coupled to the passageway storage unit about a substantially vertical axis.

3. The apparatus of claim 2, wherein the compartment door is to pivot towards a passenger seating area in the fuselage to move from the closed position to the fully open position.

4. The apparatus of claim 3, wherein the passageway storage unit is to be disposed between an entranceway of the fuselage and the passenger seating area.

5. The apparatus of claim 1, wherein a radius of curvature of the curved section of the compartment door is similar or equal to a depth of the storage compartment.

6. The apparatus of claim 1, wherein the compartment door includes a substantially planar section defining a portion of a face of the first side of the passageway storage unit.

7. The apparatus of claim 1, wherein the passageway storage unit comprises a first storage assembly and a second storage assembly, the first storage assembly to be coupled the interior floor and the fuselage, the second storage assembly coupled to the first storage assembly.

8. The apparatus of claim 7, further comprising a light coupled to the second storage assembly, wherein a portion of an edge of the second storage assembly is to be adjacent and spaced apart from the fuselage, the light to illuminate a gap between the edge of the second storage assembly and a face of the first storage assembly.

9. An apparatus, comprising:
an aircraft including a fuselage; and
a passageway storage unit supported on an interior floor of the fuselage, the passageway storage unit including:
  a first side to be adjacent a first portion of a passageway of the fuselage, the first portion of the passageway extending in a first direction;
  a second side to be adjacent a second portion of the passageway of the fuselage, the second portion of the passageway extending in a second direction different than the first direction;
  a curved corner extending from the first side to the second side, passengers to move around the curved corner to move between the first portion of the passageway and the second portion of the passageway;
  a compartment accessible via an opening defined by the first side, the second side and the curved corner; and
  a door coupled to the passageway storage unit, the door having a first end disposed on the first side and a second end disposed on the second side when the door is in a closed position and a curved section extending between the first end and the second end, the curved section defining a portion of the curved corner, a position of the curved section to move relative to the first side when the door is moved from the closed position to a fully open position, the door in the closed position to cover the opening of the compartment, the door in the fully open position to enable access to the compartment via the opening.

10. The apparatus of claim 9, wherein the door defines a portion of a substantially planar face of the first side of the passageway storage unit.

11. The apparatus of claim 9, wherein the first end of the door is pivotably coupled to the passageway storage unit via a hinge.

12. The apparatus of claim 9, wherein the passageway storage unit includes a wall coupled to the fuselage, the wall shaped to substantially conform to a shape of the fuselage.

13. The apparatus of claim 9, wherein the door is to move away from an entranceway of the fuselage when the door moves from the closed position to the fully open position.

14. The apparatus of claim 9, wherein the passageway storage unit includes a tray table movable between an upright position and an in-use position.

15. The apparatus of claim 14, wherein the tray table in the upright position covers a cavity defined by the passageway storage unit, the cavity to be accessible when the tray table is in the in-use position.

16. The apparatus of claim 15, wherein the tray table in the in-use position extends into a passenger seating area of the fuselage.

17. An apparatus, comprising:
a storage assembly to be supported on a floor of an interior of a fuselage of an aircraft, the storage assembly having a curved corner to be adjacent a passageway of the interior of the fuselage, the passageway to extend around the curved corner; and
a door coupled to the storage assembly, the door having a first end disposed on a first side of the storage assembly and a second end disposed on a second side of the storage assembly when the door is in a closed position and a curved section extending between the first end and the second end, the curved section defining a portion of the curved corner, a position of the curved section to move relative to the first side when the door is moved from the closed position to a fully open position, the door to cover an opening of a compartment of the storage assembly when the door is in the closed position, the opening extending from the first side to the second side.

18. The apparatus of claim 17, wherein the door is pivotably coupled to the storage assembly, the door to pivot about an axis substantially perpendicular to the floor.

19. The apparatus of claim 17, wherein a radius of curvature of the corner is similar or equal to a depth of the storage assembly.

20. The apparatus of claim 17, wherein the door includes a substantially planar section defining a portion of a face of the storage assembly.

* * * * *